United States Patent
Miller et al.

(10) Patent No.: US 6,294,071 B1
(45) Date of Patent: Sep. 25, 2001

(54) METHODS OF FORMING COPPER SOLUTIONS

(75) Inventors: David Lawrence Miller; David Ross McCoy, both of Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/479,434

(22) Filed: Jan. 7, 2000

(51) Int. Cl.[7] ................................................ C25C 1/12

(52) U.S. Cl. .................. 205/704; 205/721; 205/772; 205/580; 205/581; 205/585

(58) Field of Search .................... 205/580, 581, 205/585, 704, 721, 772

(56) References Cited

U.S. PATENT DOCUMENTS

| | | | |
|---|---|---|---|
| 4,008,342 | 2/1977 | Richardson | 427/297 |
| 4,038,086 | 7/1977 | Clarke et al. | 106/15 |
| 4,208,255 | 6/1980 | Stahl et al. | . |
| 4,225,637 | 9/1980 | Richardson | 427/297 |

(List continued on next page.)

FOREIGN PATENT DOCUMENTS

| | | |
|---|---|---|
| 208483 | 5/1984 | (DE) . |
| 4204941 A1 | 8/1993 | (DE) . |
| 023841 | 9/1987 | (EP) . |
| 0508212 A1 | 10/1992 | (EP) . |
| 2167327 | 8/1973 | (FR) . |
| 11-229172 | 8/1999 | (JP) . |
| WO 82/02408 | 7/1982 | (WO) . |

OTHER PUBLICATIONS

Y. Charles Guan and Kenneth N. Han, "An Electrochemical Study on the Dissolution of Copper and Silver from Silver–Copper Alloys," *J. Electrochem. Soc.*, vol. 142, No. 6, pp. 1819–1824 (Jun. 1995).

A.S. Fouda and A.K. Mohamed, "Effect of Ethanolamines, Ethylenediamine and Ethyleneglycol on the Corrosion of Copper in Nitric Acid," *J. Electrochem. Soc. India*, pp. 244–246 (1990). No month available.

Kostic and Mladenovic, "Corrosion of A–53 Steel and Copper in an Aqueous Solution of Monoethanolanine," *Journal Zast. Mater*, 80:66042 CA, 21(7–8), pp. 167–170 (1973). No month available.

Naito, K.; Hashimoto, T.; Takemura, K., "Local Corrosion of condenser tubes in desulfurization apparatus," *Journal Sekiyu Gakkai Shi*, 11(11), pp. 872–875 (1968). No month available.

(List continued on next page.)

Primary Examiner—Arun S. Phasge
(74) Attorney, Agent, or Firm—O'Keefe, Egan & Peterman LLP

(57) ABSTRACT

Methods of dissolving copper into electrolytic solutions, such as solutions comprising nitrogen compounds, by supplying an anodic current to a copper or copper-containing metal that is in contact with an electrolytic solution comprising a nitrogen compound (such as 2-hydroxyethylamine) and carbon dioxide. Anodic current may be provided by, for example, galvanic coupling with a material having a more positive reduction potential in the electrolytic solution (or given the system of electrolytic solutions) than copper, and/or by applying an impressed anodic current to the copper or copper-containing metal. Separate reaction vessels may be employed to house a first copper metal and a second cathode metal, as well as the electrolytic solutions associated with each.

25 Claims, 14 Drawing Sheets

U.S. PATENT DOCUMENTS

| | | | |
|---|---|---|---|
| 4,259,378 | 3/1981 | Richardson | 427/352 |
| 4,404,074 | 9/1983 | Tomaszewski . | |
| 4,761,179 | 8/1988 | Goettsche et al. | 106/18.32 |
| 4,857,322 | 8/1989 | Goettsche et al. | 424/633 |
| 4,929,454 | 5/1990 | Findlay | 424/638 |
| 5,276,029 | 1/1994 | Goettsche et al. | 514/231.2 |
| 5,395,656 | 3/1995 | Liang | 427/393 |
| 5,426,121 | 6/1995 | Nobel | 514/500 |
| 5,731,036 | 3/1998 | Battershell et al. | 427/297 |
| 5,824,370 | 10/1998 | Bergervoet et al. | 427/297 |
| 5,853,766 | 12/1998 | Goettsche et al. | 424/632 |

OTHER PUBLICATIONS

Denny A. Jones, "Principles and Prevention of Corrosion," Macmillan Publishing Company, pp. 176–178, 195 (1992). No month available.

Denny A. Jones, "Polarization Studies of Brass–Steel Galvanic Couples,"*Corrosion–Nace*, vol. 40, No. 4, pp. 181–185 (Apr. 1984).

International Search Report PCT/US 01/00089 mailed; May 14, 2001 (HUNT:081PCT).

METHODS OF FORMING COPPER SOLUTIONS

BACKGROUND OF THE INVENTION

1. Field of the Invention

This invention relates to methods of dissolving copper into electrolytic solutions, and more particularly, to methods of accelerating copper dissolution into aqueous electrolytic solutions, such as those comprising nitrogen compounds. Specifically, this invention relates to methods of supplying an anodic current to copper or copper-containing metal that is in contact with an electrolytic solution comprising an amine (such as 2-aminoethanol or 2-hydroxyethylamine) and carbon dioxide, for example, by galvanic coupling with a material having a more positive reduction potential than copper (or the copper-containing metal) given the respective electrolyte conditions present at the copper (or copper-containing metal) and present at the galvanically coupled material. Copper-containing solutions thus formed may be useful, for example, as wood preservatives and for water treatment.

2. Description of Related Art

Copper-containing aqueous solutions are commonly used as biocidal fluids, for example, for pressure treating lumber and for water purification. Examples of such fluids and uses thereof may be found, for example, in U.S. Pat. No. 4,929,454. Such solutions may be formulated by dissolving copper into aqueous solutions containing alkyl amines or alkyl hydroxy amines, such as, 2-hydroxyethylamine. Relatively slow rate of copper dissolution may be a limiting feature in the production of copper-containing solutions. When in contact with aqueous alkanolamine solutions, copper is more active toward corrosion than it is in aqueous solutions which do not contain alkanolamines. However, copper is a poor catalyst for oxygen reduction. The presence of carbon dioxide may increase the solubility of copper in aqueous alkanolamine solutions, but the dissolution rate of copper may still be relatively slow.

In one conventional batch process for producing copper-containing amine solutions, approximately five days is required to achieve the target copper concentration (i.e., about 8%). Such a process may include, for example, placing copper metal into an aqueous solution containing 2-hydroxyethylamine and carbon dioxide at elevated temperature, while sparging with air.

SUMMARY OF THE INVENTION

Disclosed herein are methods and apparatus for forming copper-containing solutions, including methods and apparatus for accelerating the dissolution of copper into aqueous solutions and/or increasing the ultimate concentration of copper in such solutions. In one embodiment, disclosed is a method for increasing the rate of copper dissolution into an electrolytic solution containing one or more nitrogen compounds by supplying an anodic current to copper or copper-containing metal that is in contact with the electrolytic solution. An electrolytic solution may include at least one nitrogen compound (such as an aqueous solution containing alkanolamine), and an anodic current may be supplied by electrically coupling a metal comprising copper with a material acting as a cathode, i.e., capable of supplying an anodic current to the copper. Supplemental anodic current may be supplied to the copper metal by electrically coupling an optional power source to the copper metal, if so desired. Besides nitrogen compound/s, the aqueous solution may also include dissolved carbon dioxide and/or oxygen.

In one embodiment, the bulk of the cathodic reaction (e.g., oxygen reduction) may advantageously occur at the surface of a cathode material (e.g., a second cathode metal), instead of taking place on the surface of a first copper metal. To further enhance copper dissolution rate and reduce the solution formulation time, a material may be selected which functions catalytically as well as galvanically to accelerate copper dissolution. Combination of catalytic and galvanic enhancement may be used to result in vastly improved dissolution time and efficiency. For example, metals of relatively high oxygen reduction capacity compared to copper (e.g., such as silver) may be galvanically coupled to copper metal/s to cause an increase in copper dissolution rate. Besides silver, other metals having a reduction potential higher than the reduction potential of copper under the electrolytic conditions employed may be advantageously used, such as stainless steels.

Electrical coupling or contact between a copper containing metal and a cathode material (e.g., a second cathode metal) may be through any suitable electrical conductor through which electrical current is capable of flowing. Electrical contact may be advantageously used to form a galvanic couple between copper metal and a second cathode metal so that the anodic current density of the copper metal is increased, resulting in more rapid dissolution of copper as compared to dissolution rates realized using conventional copper dissolution systems and methods. Further advantageously, the disclosed process also may reduce the corrosion rate of a galvanically coupled second cathode metal, resulting in extension of its useful life.

As an example, in one embodiment, a doubling in copper dissolution rate in amine-containing solutions may be realized as compared to dissolution rates realized using conventional copper dissolution systems. In another embodiment, by increasing dissolved oxygen concentration in the presence of the second cathode metal, up to about thirty-fold increase in copper dissolution may be achieved. Surprisingly and significantly, solution formulation process time may be reduced from a conventional process time of about five days to a reduced process time of about one day, greatly facilitating and reducing the cost of preparing the copper-containing amine solutions. Maximum achievable concentration of dissolved copper in an electrolytic amine-containing solution may be greater than maximum achievable dissolved copper concentration using conventional copper dissolution methods due to greater thermodynamic driving force and shifted equilibrium. Thus, the disclosed method may be used to formulate a more concentrated copper-containing solution than would otherwise be achievable using conventional methods.

In another embodiment, an anodic current may be applied to a copper metal, either alone or in combination with galvanic coupling described elsewhere herein. Such an anodic current may be applied by electrically coupling a positive voltage of a power source to a copper metal and by coupling a negative voltage of the power source to a suitable counterelectrode. Advantageously, such an anodic current may be applied in addition to galvanic coupling to provide increased galvanic driving force for copper dissolution, in addition to catalytic enhancement of dissolution.

In another embodiment, a continuous flow process may be advantageously employed to produce copper-containing solutions without need for batch processing and reducing overall process time. In such an embodiment, a reaction vessel may be sized and dimensioned to optimize dissolution of copper ions into solution during a single pass through the reaction vessel to achieve the desired copper ion content.

In yet another embodiment, a second cathode material having a reduction potential that is greater than copper (given the respective electrolyte conditions present at the copper anode and the cathodic material cathode) may be electrically or galvanically coupled to a first copper metal while at the same time being located in a separate vessel and/or solution than the copper metal. The separate vessels or solutions may be in ionic communication by virtue of, for example, an electrolyte bridge which may or may not be sealed with an ion permeable membrane. Advantageously, by providing separate environments for a first copper metal and a second cathode metal, solution and operating conditions in the vessel containing the cathode metal may be optimized to increase, for example, oxygen reduction conditions, while allowing separate optimization of copper oxidation conditions in a separate vessel in which the copper metal is contained. Such optimization may be used alone or in combination with any of the other embodiments described elsewhere herein to achieve further increases in copper dissolution rate and/or dissolved copper concentration.

In one respect then, disclosed is a method for dissolving copper, including: electrically coupling a first copper metal to a second cathode material; exposing the first copper metal to a first electrolytic solution including water, nitrogen compound and carbon dioxide; and exposing the second cathode material to a second electrolytic solution including water and oxygen; wherein the first and second solutions are in ionic communication with each other; wherein the second cathode material has a more positive reduction potential than the first copper metal given the respective electrolyte conditions present at the first copper metal and at the second cathode material; and wherein (or such that) copper ions are released by the first metal into the first electrolytic solution.

In another respect, disclosed is a method for dissolving copper, including: electrically coupling a first metal including copper to a second cathode metal, the second cathode metal including at least one of iron, nickel, chromium, silver, stainless steel, or a mixture thereof; exposing the first metal to a first electrolytic solution including from about 1% to about 80% 2-hydroxyethlylamine by weight of total solution; exposing the second cathode metal to a second electrolytic solution including water; introducing a gas including carbon dioxide into the first electrolytic solution so that the first electrolytic solution further includes from about 50 ppm to about 50% by weight of total weight of the first electrolytic solution of dissolved carbon dioxide; introducing a gas including oxygen into the second electrolytic solution so that the second electrolytic solution further includes from about 0.001 ppm to about 5000 ppm oxygen; wherein the first and second solutions are in ionic communication with each other; and wherein (or such that) copper ions are released by the first metal into the first electrolytic solution.

In another respect, disclosed is a method for dissolving copper, including: electrically coupling a first copper metal to a cathode electrode; exposing the first copper metal to a first electrolytic solution including water, nitrogen compound and carbon dioxide; exposing the cathode electrode to a second electrolytic solution including water and oxygen, wherein the first and second electrolytic solutions are in ionic communication with each other; and applying anodic current to the first metal and cathodic current to the cathode electrode; wherein (or such that) copper ions are released by the first metal into the first electrolytic solution.

DESCRIPTION OF ILLUSTRATIVE EMBODIMENTS

Figure 1:
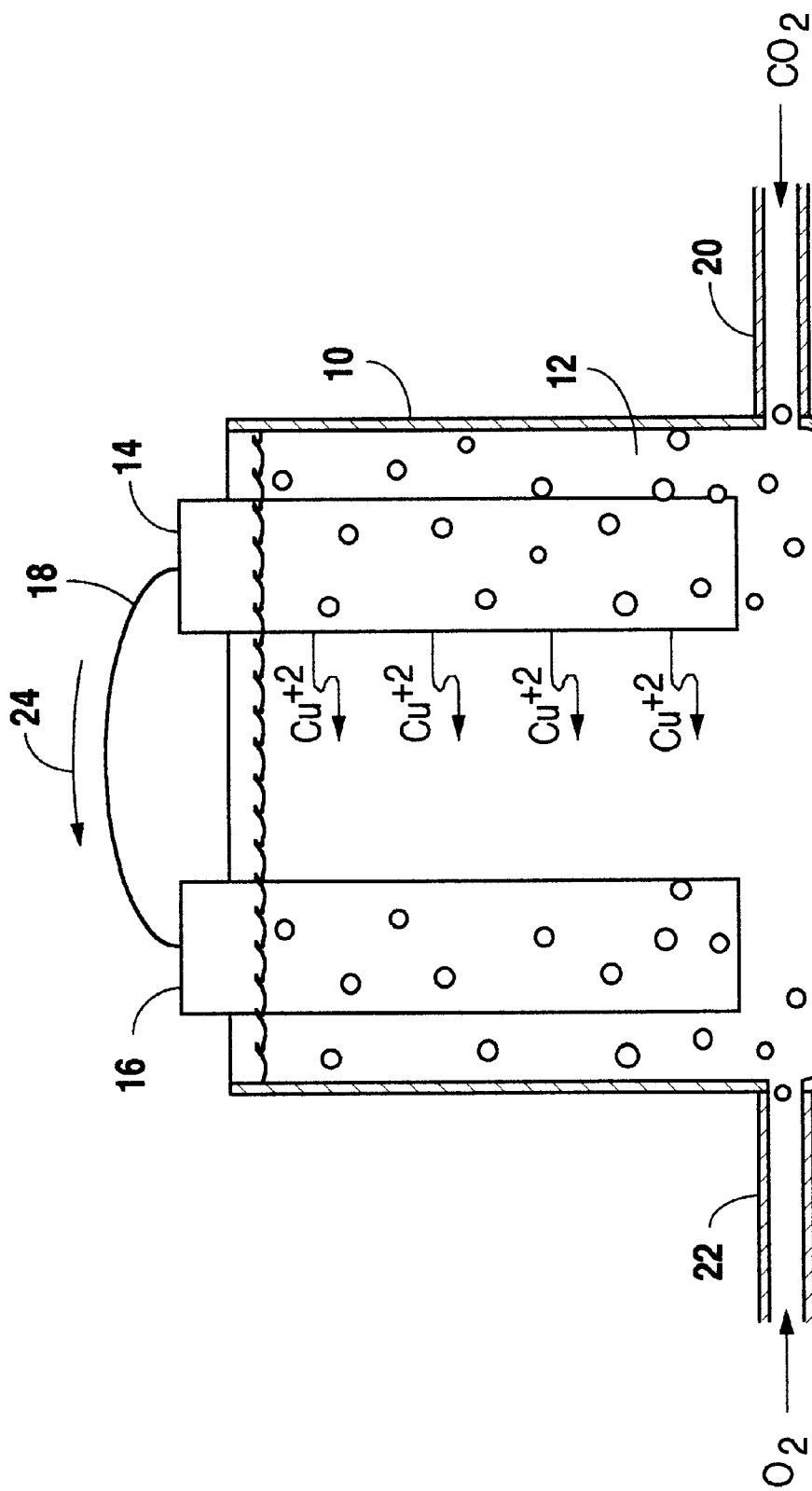
FIG. 1 is a simplified process schematic according to one embodiment of the disclosed process.

As used herein, the indefinite articles "a" and "an" connote "one or more."

The disclosed methods may be used to form copper-containing aqueous solutions, including, but not limited to, solutions containing copper and nitrogen compound/s, such as those described in U.S. Pat. Nos. 4,949,454; 5,853,766; 5,426,121; 5,276,029; 4,857,322; 4,761,179; 4,259,378; 4,038,086. An Electrochemical Study on the Dissolution of Copper and Silver from Silver-Copper Alloys by Y. Charles Guan and Kenneth N. Han, Journal of the Electrochemical Society v. 142, No. 6, pp. 1819–1824 (June 1995); Effect of Ethanolamines, Ethylenediamine and Ethyleneglycol on the Corrosion of Copper in Nitric Acid by A. S. Fouda and A. K. Mohamed, J. Electrochem. Soc. India pp. 244–246 (1990); and Corrosion of A-53 Steel and Copper in an Aqueous Solution of Monoethanolamine, by Slavoljub Kostic and Streten Mladenovic, Journal Zast. Mater., 80:66042 CA, 21 (7–8), pp. 167–70 (1973) each of which is incorporated herein by reference.

Using the disclosed methods, dissolution of copper into aqueous solutions may be accelerated, and/or maximum achievable copper content in such solutions increased, using galvanic coupling and/or impressed anodic current. Such solutions may also optionally contain dissolved carbon dioxide and/or dissolved oxygen to further enhance copper dissolution rate and/or concentration in solution. Advantageously, galvanic coupling and/or impressed anodic current may be used to accelerate oxidation of copper and dissolution of copper ions resulting therefrom. Dissolution of copper ions may be further enhanced by the presence of an amine, such as ammonia ($NH_3$), alkanolamine and/or alkylamine, as well as dissolved carbon dioxide which may serve to increase solubility of copper in solution. Furthermore, dissolved oxygen may be optionally present at the second cathode metal to enhance oxygen reduction reactions at the cathode metal, further facilitating copper dissolution.

In the practice of the disclosed method, copper-containing solutions may be formed from dissolution or oxidation of copper metals, or metals comprising copper. As used herein, "copper metal" includes any metal composition capable of supplying copper ions to solution upon oxidation. Suitable copper metals for use in the practice of the disclosed method include pure copper (e.g., solid elemental copper), as well as alloys of copper with other materials. "Pure copper" includes substantially pure elemental copper (Cu), with or without impurities such as is commercially available. Copper alloys suitable for use in the disclosed method include alloys of copper with other metals, such as Zn, Sn, etc. Copper alloys include, but are not limited to, metals containing copper in combination with other metals such as Brass, Bronze, etc. It will be understood with the benefit of this disclosure by those of skill in the art that copper alloys having varying amounts of copper may be employed, and that the amount of copper contained in a copper alloy may be varied in relation to other materials, for example, so as to achieve the desired copper dissolution rate and final copper content in solution as described elsewhere herein.

Suitable cathode materials include any material/s having a more positive reduction potential than copper (or a copper-containing metal) when the cathode material is galvanically or electrically coupled to the copper (or copper-containing metal), and given the respective electrolyte conditions present at the copper (or copper-containing metal) anode, and at the cathode material. Thus, with benefit of this disclosure, cathode materials may be selected to meet this criteria when a common electrolyte solution is employed, or when respective anodic and cathodic electrolyte solutions are employed (i.e., when more than one electrolyte solution is used, such as separate electrolyte solutions for the anode and cathode). Examples of cathode materials include, but are not limited to, any pure metal or metal alloy having a more positive reduction potential than copper in a common electrolyte solution or given the combination of respective electrolyte solutions employed at the anode and cathode. For information, examples of standard reduction potentials (versus normal hydrogen electrode at 25° C., volts) are presented for a few metals in Table 1 below.

TABLE 1

Example Standard Reduction Potentials

| Metal-metal ion equilibrium (unit activity) | Electrode potential vs. normal hydrogen electrode at 25 ° C., volts |
|---|---|
| Au—Au$^{+3}$ | +1.498 |
| Pt—Pt$^{+2}$ | +1.2 |
| Pd—Pd$^{+2}$ | +0.987 |
| Ag—Ag$^+$ | +0.799 |
| Hg—Hg$_2^{+2}$ | +0.788 |
| Cu—Cu$^{+2}$ | +0.377 |
| H$_2$—H$^+$ | 0.000 |

With the benefit of this disclosure, those of skill in the art will understand that reduction potential or reversible potential ("Erev") is modified by ion concentration, temperature and/or presence of other electrolyte components such as nitrogen-containing compounds, especially for copper. These parameters may alter the relative position of the exemplary materials shown in Table 1.

Examples of non-metallic cathode materials include, but are not limited to, carbon, graphite, and electrically conducting polymers (such as polypyrrole, polyaniline, polyparaphenylene, polythiophene, polyacetylene, etc.) Other materials suitable for forming a second cathode metal include, but are not limited to, metal oxides, liquid metals (e.g., Hg), etc.

Specific examples of metals (either pure or as alloys) suitable for forming a second cathode metal that may be galvanically or electrically coupled to a first copper metal include, but are not limited to iron, stainless steel, silver, nickel, molybdenum, zirconium, gold, platinum, palladium, aluminum, chromium, mixtures thereof, etc. It will be understood with benefit of the disclosure, that these examples are exemplary only, and that any other metal or combination of metals may be employed which meet the specific standard reduction potential criteria set forth herein.

Metals and metal alloys described herein may be employed in any form suitable for galvanic coupling, as long as copper metals are capable of dissolving or otherwise supplying copper ions to solution, and so long as either copper or cathode metal components do not adversely affect dissolution of copper metals, for example, by dissolving to produce competing ions, decreasing copper dissolution rate and/or reducing the ultimate copper containing content of the solution. In one embodiment, a solid metal may be employed.

In the practice of the disclosed method, a nitrogen-containing compound may be employed as a constituent of an electrolytic solution in which copper dissolution occurs. By "electrolytic solution" it is meant any solution that allows ionic conductivity. Suitable nitrogen-containing compounds include compounds which have the characteristic of possessing at least one nitrogen atom capable of affecting copper dissolution or solubility. Examples of types of nitrogen-containing compounds include, but are not limited to, mono and multi-functional amines (including di- and tri-functional alkyl amines and alkanol amines), ammonia, ammonia-based salts, quaternary ammonium salts, amines, amides, carbamates, ureas, nitrites, imines, azoles, cyanates, and mixtures thereof. Examples of specific mono-functional amines include, but are not limited to, 2-hydroxyethylamine, hydroxyethylamine, bis-(hydroxyethyl) amine, tris-(hydroxyethyl) amine, methyl-bis-(hydroxyethyl) amine, 2,2'-hydroxyethoxyethylamine, pyrrole, N-methylpyrrole, morpholine, N-methyl morpholine oxide, etc. Also, suitable are reaction products of these amines (such as carbamates, ureas, and amides). Other suitable examples are amines of aromatic character including, but are not limited to, pyridine, N-methylpyridine, aniline, and mixtures thereof. Examples of multi-functional amines include, but are not limited to, ethylene diamine, ethylenediamine tetra-acetic acid, amino acids such as glycine and phenylalanine, imidazole, benzotriazole, phenylenediamine, and thiazoles, and mixtures thereof.

In the practice of the disclosed method, one or more nitrogen-containing compounds may be present in any amount suitable, for example, for chelating with copper atoms, forming ligands, forming soluble salts, or otherwise increasing solubility or dissolution rates, and mixtures thereof. However, in one embodiment, one or more nitrogen compounds are present in an amount from about 1% by weight to about 100% by weight, alternatively from about 1% by weight to about 80% by weight, alternatively from about 5% by weight to about 80% by weight alternatively from about 20% by weight to about 80% by weight, alternatively from about 20% by weight to about 60% by weight by total weight of aqueous electrolytic solution, with it being understood that nitrogen compound concentrations outside these ranges are also possible. Alternatively, from about 5% to about 60% of one or more nitrogen compounds by weight, further alternatively from about 5% by weight to about 50% by weight of total weight of aqueous electrolytic solution may be employed. Further information on suitable nitrogen-containing compounds and electrolytic solutions formed therewith may be found in U.S. Pat. No. 4,929,454, and 4,761,179 which are incorporated herein by reference.

In the practice of the disclosed method, aqueous electrolytic solutions may optionally comprise carbon dioxide to, among other things, increase the solubility or dissolution rate of copper and to modify the pH to affect the solubility or dissolution rate of copper, and mixtures thereof. In this regard, carbon dioxide may be introduced by any method suitable for introducing dissolved carbon dioxide into solution including, but not limited to, by gaseous $CO_2$ (e.g., sparging, injecting, bubbling, etc.), as solid $CO_2$ (dry ice), etc. The $CO_2$ content may then be left unaltered or $CO_2$ may be continuously added during the process. Further, the $CO_2$ may be added as alkali or ammonium salts of carbonate or bicarbonate, and mixtures thereof. Concentrations of carbon dioxide may be maintained in any amount suitable to, for example, increase the solubility or dissolution rate of copper, whether by decreasing the pH, or by formation of carbonate, bicarbonate, or carbamate, or mixtures thereof. However, in one embodiment, an amount of $CO_2$ may be from about 50 ppm to about 30% by weight, alternatively from about 0.1% to about 30% by weight, alternatively from about 5%to about 12% by weight, and further alternatively from about 8% to about 9% by weight of total weight of electrolytic solution. $CO_2$ concentrations outside these ranges may also be employed.

In the practice of the disclosed method, an electrolytic solution may also optionally comprise dissolved oxygen in an amount sufficient to accept electrons at cathodic surface sites. Further, the oxygen may oxidize solution species of copper, such as $Cu^{+1}$ to $Cu^{+2}$, and mixtures thereof. Dissolved oxygen content may be provided and maintained in an electrolytic solution using any method suitable for this purpose, such as by piping through a tube, sparger, diffuser, aerator, or supplied to the vapor area. Air or oxygen gas, or any mixture thereof, may be used. Added optional oxidizers, such as $Fe^{+3}$ or $Cu^{+2}$ may also be added to the solution, or mixtures thereof. In one embodiment, oxygen may be supplied to electrolytic solution by bubbling oxygen through the electrolytic solution, such as an electrolytic solution contained in a reaction vessel. Because oxygen reduction occurs at the cathode metal, it may be desirable to provide oxygen at a location within the electrolytic solution such that dissolved oxygen content is present primarily or exclusively at the cathode metal. In this regard, amount of dissolved oxygen present in electrolytic solution at a cathode metal may be any amount suitable for accepting electrons at cathodic surface sites. Further, the oxygen may oxidize solution species of copper, such as $Cu^{+1}$ to $Cu^{+2}$, and mixtures thereof. In one embodiment, from about 0.001 parts per million ("ppm") to about 5000 ppm, alternatively from about 0.01 ppm to about 500 ppm alternatively from about 0.1 ppm to about 30 ppm of dissolved oxygen may be present at the cathode, although oxygen concentrations outside these ranges are also possible.

In the practice of the disclosed method, an electrolytic solution may have any pH in which dissolution of copper ions from a copper metal (or a metal comprising copper) will occur. However, in one embodiment a pH of an electrolytic solution may be from about 5 to about 14 alternatively from about 8 to about 12, although pH values outside these ranges may also be possible. Although a pH of an electrolytic solution may be a function of the concentration of nitrogen compound present in solution (such as amine concentration), other optional pH adjustment components, such as $CO_2$, acids (HCl, $H_2SO_4$, $HNO_3$, etc.), bases ($NH_3$, KOH, NaOH, etc.) may also be employed.

Other optional components which may be present in an electrolytic solution (with or without one or more of other electrolytic solution components already mentioned) include, but are not limited to, chelating agents, oxidizing agents, buffers, pH adjusters, corrosion inhibitors (for metals other than copper), agents that increase oxygen solubility, stabilizers, antifoamants, or dyes, and mixtures thereof etc. Suitable chelating agents include any material capable of increasing copper dissolution rate by binding to copper ions to increase the solubility of copper in solution, increasing the tendency of copper to oxidize, or otherwise enhancing removal of copper ions from the solid copper surface. In one embodiment, separate chelating agent/s may be present to be in contact with at least a copper anode, for example as a component of a first electrolytic solution, although in this embodiment such chelating agents may be present at both anode and cathode. Examples of types of suitable chelating agents include, but are not limited to, polyamines, crown ethers, certain carboxylic acid salts, carbamates, amides, ureas, sulfates, phosphates, phosponates, and mixtures thereof, etc. Specific examples of suitable chelating agents include, but are not limited to, ethylenediamine tretra-acetic acid ("EDTA"), citrate, oxalate, diethylene triamine, hydroxyethylcarbamate, tris-hydroxyethylethylenediamine, bis-hydroxyethylurea, aminoethylphosphonate, and mixtures thereof, etc. Suitable oxidizing agents include any material capable of increasing copper dissolution rate by accelerating corrosion of copper and thus, dissolution of copper ions into solution. In one embodiment, separate oxidizing agent/s may be present to be in contact with a copper anode and/or cathode material, for example as a component of first and/or second electrolytic solutions. Examples of types of suitable oxidizing agents include, but are not limited to, iron (III) salts, tin (IV) salts, peroxides, bisulfates, permanganates, perchlorates, nitrates, iodates, Cu (II) salts, hypochlorates, bromates, dichromate, or oxygen, and mixtures thereof, etc. Specific examples of oxidizing agents include, but are not limited to, hydrogen peroxide, ozone, nitrous oxide, nitric oxide, permaganate, perchlorate, iodate, nitrate, benzoquinone, mixtures thereof, etc.

Furthermore, electrolytes including salts of phosphate, borate, nitrate, nitrite, sulfate, acetate, mixtures thereof, etc. may be employed to, for example, provide pH stability, act as corrosion inhibitors, and/or provide ionic conductivity. Certain electrolytes may also be present to increase oxygen solubility. Examples of these include salts of trifluoroacetic acid, fluorinated alcohols, mixtures thereof, etc.

FIG. 1 is a simplified sectional schematic showing a vessel 10 containing an electrolyte solution 12. Also shown in FIG. 1 is first copper metal 14 which is submerged in electrolyte solution 12. First metal 14 is shown galvanically coupled to second cathode metal 16 via conductor 18. Second cathode metal 16 is also submerged in electrolytic solution 12. In operation, a potential exists between first copper metal 14 and second cathode metal 16 such that an electron flow or current 24 is established between copper anode 14 and cathode metal 16. As shown in FIG. 1, copper ions are released at the surface of copper metal 14 into electrolytic solution 12. Electrons 24 travel from copper metal 14 to cathode metal 16 via conductor 18 and result in reduction of solution species 12 at the surface of cathode metal 16.

Although one exemplary embodiment is illustrated in FIG. 1, first copper metal 14 and/or second cathode metal 16 may be constructed and/or configured in any manner suitable for galvanic coupling and exposure to an electrolytic solution to allow dissolution of copper ions into the solution. As used herein, "exposure" to an electrolytic solution means immersion, partial immersion, or any other type of contact between a metal and a solution suitable for allowing ions to be exchanged. For example, first metal 14 and second metal 16 may be metal plates that are hung or suspended inside of reaction vessel 10 in the manner so that they are partially or substantially exposed to electrolytic solution 12. In such an embodiment, first metal 14 and/or second metal 16 may be present, for example, as single or multiple plates immersed within electrolytic solution 12. Further, a reaction vessel 10 may be partially or wholly manufactured from a second cathode metal as described elsewhere herein, and galvanically or electrically coupled to a first copper metal. In this regard, a lining of reaction vessel 10 may be present on a portion or substantially all of the interior of vessel 10 and galvanically coupled to second cathode metal 14 as previously described. Such a lining may exist in place of, or in addition to, the presence of a separate second cathode metal 16 present within vessel 10 as illustrated in FIG. 1

First copper metal 14 may be galvanically coupled to second cathode metal 16 in any manner suitable for conducting electrons between first copper metal 14 and second cathode metal 16. For example, first copper metal 14 may be directly coupled or joined to second cathode metal 16 using in any coupling method known in the art (e.g., as a single piece structure such as a bar, etc.), and/or may be coupled via separate conductor/s such as via wire, cables, threaded fasteners, solder, welds, metal clamping devices, etc. Alternatively, a first copper metal 14 may be directly coupled or joined to a second cathode metal 16, such as by fabrication as a single metal piece. Furthermore, mixtures of first copper metals and second cathode metals may be employed (including alloys of copper with second cathode metals), as long as electrons are conducted between the first and second metals, and copper dissolution results.

A reaction vessel 10 may be any vessel suitable for containing an electrolytic solution 12 such that contact is maintained between solution 12 and at least a portion of first copper metal 14 and at least a portion of second cathode metal 16. Examples of suitable reaction vessels include, but are not limited to, vessels constructed of steel, stainless steel, other metals suitable for construction, glass, polymeric materials such as rubber, nylon, polyethylene, etc., wood, ceramics, clays, etc.

As shown, vessel 10 may be equipped with optional carbon dioxide feed 20 positioned adjacent first copper metal electrode 14 such that a concentration of dissolved carbon dioxide is present in the vicinity of the surface of first metal 14 to assist in the dissolution and retention of copper ions. Optional oxygen-containing gas feed 22 is shown positioned adjacent second cathode metal 16 such that increased dissolved oxygen content is present in the vicinity of the surface of second cathode metal 16 in order to facilitate oxygen reduction at the cathode of the galvanic coupling. In this regard, any gas comprising oxygen content suitable for increasing dissolved oxygen content may be employed. Examples include, but are not limited to, substantially pure gaseous oxygen, air, mixtures thereof, etc. Substantially pure oxygen may be used to provide greater dissolved oxygen content than possible with gases containing other components, such as air.

Although optional carbon dioxide feed 20 and optional oxygen feed 22 are shown positioned adjacent and below first copper metal 14 and second cathode metal 16, respectively, it will be understood with the benefit of this disclosure that any other positioning of input apparatus may be employed for introducing and maintaining concentrations of these gases within electrolytic solution 12. For example, such solutions may be sparged together in a mixture and/or separately in any number of positions within reaction vessel 10, such as, for example, through single or multiple tubes, with or without the incorporation of spargers or diffusers, etc.

It will be understood with benefit of this disclosure by those of skill in the art that the disclosed methods may be practiced to achieve desired copper concentrations in an electrolytic solution, and/or desired copper dissolution rates by controlling one or more of the process parameters disclosed herein (e.g., concentrations of nitrogen compound/s and/or dissolved gases, impressed current, dissolution time, etc.). Initially, electrolytic solutions may contain substantially no copper ions, or alternatively may contain a concentration of copper ions that is less than a desired final copper ion concentration following copper dissolution according to the disclosed method (e.g., less than about 0.1% by weight or less than about 0.2% by weight of total weight of electrolytic solution). In one exemplary embodiment employing a process scheme similar to that illustrated in FIG. 1, copper dissolution may be allowed to proceed until an amount of dissolved copper (or copper ions) present within an electrolytic solution is greater than about 0.2% by weight, alternatively greater than about 5% by weight, alternatively greater than about 12% by weight of total weight of electrolytic solution, alternatively from about 12% to about 15% by weight of total weight of electrolytic solution. In another exemplary embodiment employing a process scheme similar to that illustrated in FIG. 1, copper dissolution may be allowed to proceed until an amount of dissolved copper (or copper ions) present within an electrolytic solution is from about 0.01% to about 30% by weight, alternatively from about 0.2% to about 15% by weight, alternatively from about 5% to about 15% by weight, alternatively from about 7% to about 15% by weight, alternatively from about 8% to about 12% by weight, and further alternatively from about 9% to about 10% by weight of total weight of electrolytic solution. Once again, these amounts are exemplary only, and ultimate copper content may be controlled as desired by limiting the time of exposure, relative amounts of anodic copper metal to cathodic metal, etc. Thus, it will be understood with benefit of this disclosure that amounts of dissolved copper greater than, or less than, values within these given ranges are also possible.

In one embodiment, a desired amount of copper concentration may be achieved by allowing copper dissolution to occur until the electrochemical reaction equilibrates or reaches near equilibrium. This is typically a function of copper concentration within electrolytic solution 12, because as the amount of copper in solution increases, the driving force for copper dissolution decreases. Advantageously, further increases in the equilibrium copper concentration may be achieved by change in potential at the copper electrode induced by galvanic coupling. Change in potential may shift the concentration of dissolved copper, that balances the electrochemical dissolution, to higher values.

Rate of copper dissolution may be further enhanced by, for example, increasing the amount of copper metal 14 relative to the theoretical equilibrium concentration. This increase in copper metal increases the average surface area during the dissolution process, thereby maximizing dissolution rates. For example, in one embodiment, about three times the amount of copper necessary for achieving a desired equilibrium copper concentration in electrolytic solution 12 may be employed. Increasing the surface area of the cathode material may also be used to further increase the rate of copper dissolution, in addition to benefits obtained by increasing copper surface area.

The disclosed method may be carried out at any temperature and/or pressure at which copper dissolution occurs. In one embodiment of the disclosed process, a first copper metal and second cathode metal may be galvanically coupled and exposed to an electrolytic solution at a temperature from about 0° C. to about 110° C. and/or a pressure of from about 0 psig to about 500 psig. Although such temperatures and pressures may be employed in this embodiment, it will be understood with the benefit of this disclosure that temperatures and pressures outside these ranges may be employed as well.

Figure 2:
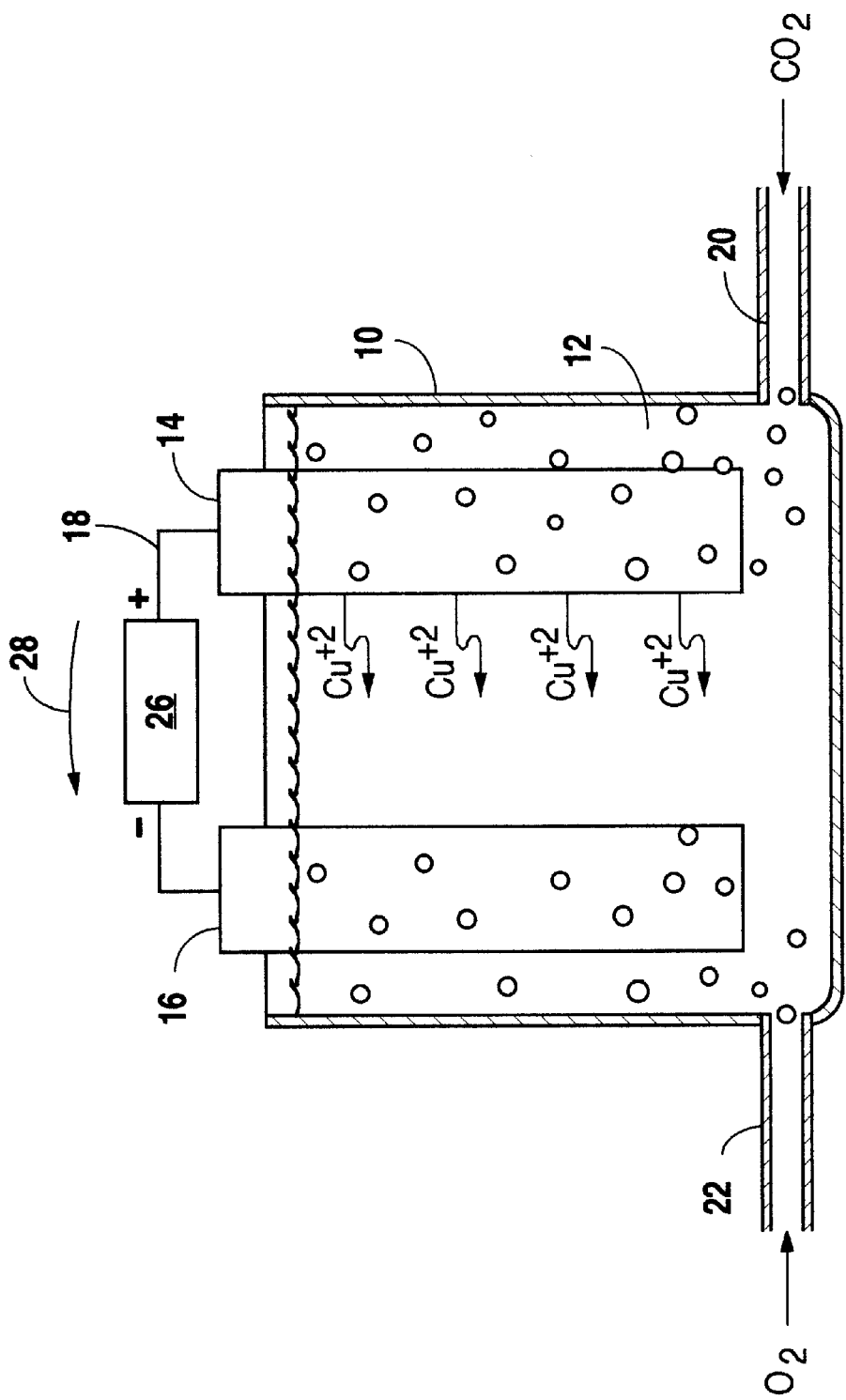
FIG. 2 is a simplified process schematic according to another embodiment of the disclosed method.

FIG. 2 illustrates another embodiment of the disclosed method in which an anodic current may be applied to accelerate the dissolution of first copper metal 14. In the embodiment of FIG. 2, anodic current is applied using power source 26 to result in application of a positive voltage to first copper metal 14 and a negative voltage to second cathode metal 16. Power supply 26 may be any device capable of generating or applying a positive voltage to first copper electrode 14 and a negative voltage to second cathode metal electrode 16, such that resulting current 28 is greater than electrochemically generated current 24 present in the absence of power source 26, and illustrated in FIG. 1. Examples of suitable power supplies 26 include, but are not limited to batteries, generators, line current, potentiostats, galvanostats, photovoltaics, fuel cells, etc. Although direct current is preferred, alternating current may be utilized as well. Although any voltage and/or current type suitable for facilitating dissolution of first copper metal 14 may be employed, in one embodiment a potentiostat power source 26 having a voltage of from about 0.1 mV to about 5 volts DC may be used to generate a current 28 of from about 1 mA to about 100 amps with current 28 representing the total current resulting from power source 26 and electrochemical potential between first copper metal 14 and second cathode metal 16. Current may be so applied to result in copper dissolution whether or not copper is coupled to another electrode that has a more positive potential than copper in the electrolyte solution, or does not (e.g., inert or even more negative potential than copper), as described further below.

In a further embodiment, a power source 26 may be employed to apply an anodic current to first copper metal 14 and a cathodic current to an inert electrode exposed to an electrolytic solution 12, rather than a cathode metal electrode. In such a case, it may be desirable to employ greater voltage and/or current in view of the absence of electrochemical potential between copper containing electrode 14 and the inert electrode. For example, a power source 26 having a voltage of from about 0.1 mV to about 5 volts DC may be used to generate a current 28 of from about 1 mA to about 100 amps.

In another embodiment, a power source 26 may be employed to apply an anodic current to first copper metal 14 and a cathodic current to a second cathode metal that would not, without the application of external power, act to accelerate copper dissolution. Advantageously, in this embodiment, electrode materials that do not possess more positive potentials to copper may be used. For example, a power source 26 having a voltage of from about 0.1 mV to about 5 volts DC may be used to generate a current 28 of from about 1 mA to about 100 amps.

Figure 3:
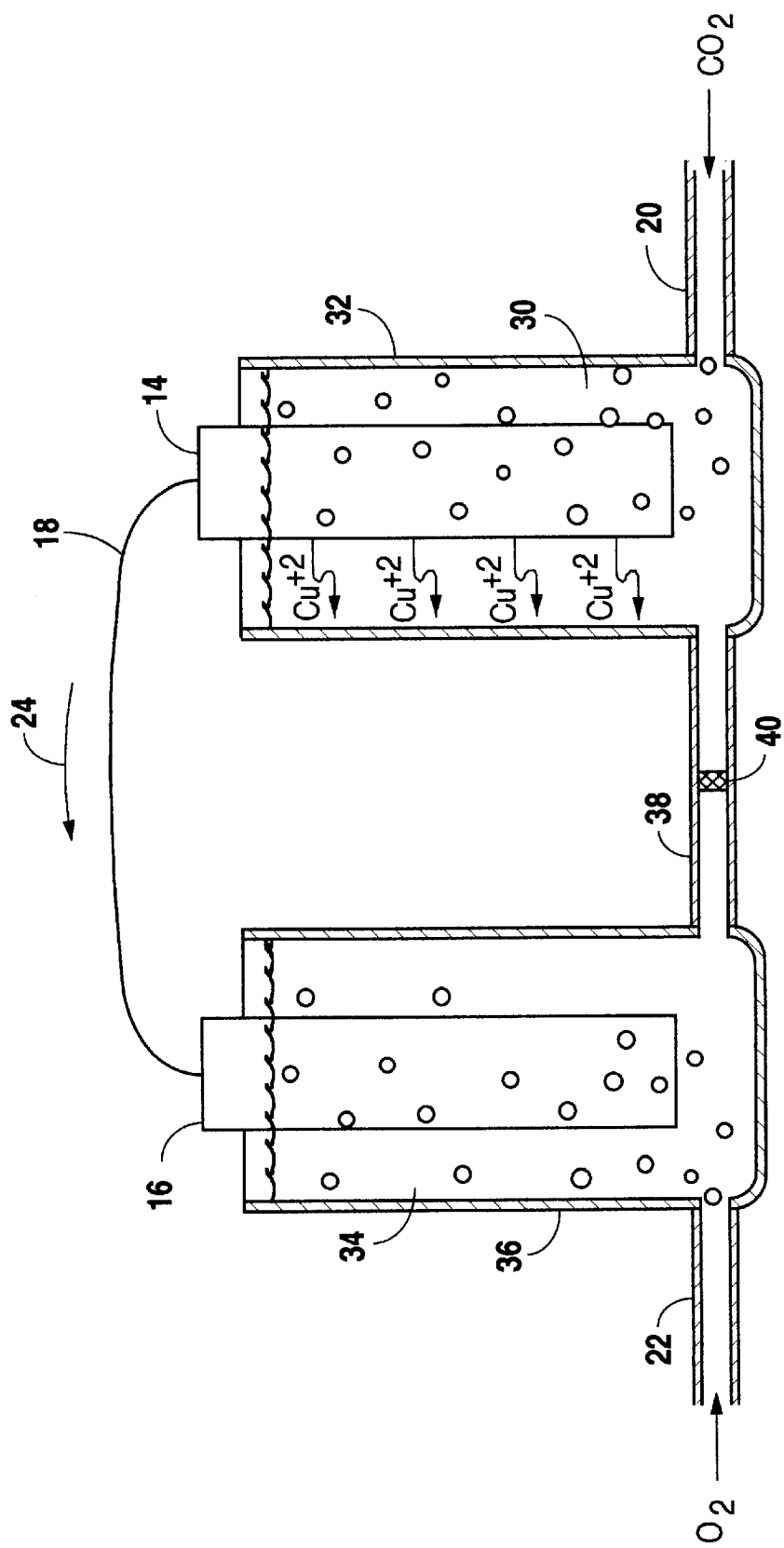
FIG. 3 is a simplified process schematic according to another embodiment of the disclosed method.

Galvanic coupling of a first copper metal 14 and a second cathode metal 16 located or positioned in a separate reactor vessel may be carried out by means of, for example, an electrical cable between the cathode 16 and the anodic copper metal 14, and an electrolyte bridge between the two vessels. For example, in FIG. 3 first copper metal 14 is exposed to a first electrolytic solution 30 present within first reaction vessel 32. Second cathode metal 16 is exposed to electrolytic solution 34 within second reaction vessel 36. For example, as shown in FIG. 3, first reaction vessel 32 is in ionic communication with second vessel 36 via conduit 38. One or more features may be provided, if so desired, to minimize mixing of first and second electrolytic solutions. For example, optional ion-permeable wall 40 is shown in position within conduit 38 and may be employed to prevent intermixing of first electrolytic solution 30 with second electrolytic solution 34, while at the same time allowing ionic communication between the two vessels. In another embodiment, conduit 38 may be dimensioned to minimize mixing of first and second solutions 30 and 34 by, for example, a reduction in the inner diameter of conduit 38 such as to produce a restriction to fluid flow.

As used herein, "ionic communication" means that ions may migrate or move between a first solution and/or first vessel (e.g., reaction vessel 32) and a second solution and/or second vessel (e.g., reaction vessel 36). Ionic communication may be present across an ion permeable wall 40 which may be formed of materials including, but not limited to, ionic permeable materials constructed of glass, ceramic, metal, polymeric materials, cellulose fiber, wood, etc. Specific examples of such materials include, but are not limited to glass frits, porous zirconia ceramic, porous stainless steel, polyethylene, polytetrafluoroethylene ("PTFE"), cotton, thinly sectioned wood, etc. In one example, porosity may be natural to the material or may be created by formation of small diameter passages through a solid material. In an alternative embodiment, thin material/s such as a wire or strand can be coiled into the form of an ionically permeable restriction. etc.

In the embodiment of FIG. 3, an electron path is provided by conductor 18 which allows electrons to flow from first copper metal 14 to second cathode metal 16 in a manner as previously described. By employing separate vessels 32 and 36, conditions at first copper metal anode 14 and second cathode metal 16 may be advantageously and independently enhanced to increase copper dissolution rate. For example, copper dissolution rate produced by galvanic coupling is dependent on dissolved oxygen concentration in solution at the surface of cathode metal 16. However, relatively high temperatures and presence of other gases (such as $CO_2$), which may favor copper dissolution may also act to reduce dissolved oxygen concentration. Advantageously, providing multiple reaction vessels 32 and 36 allows electrolytic solution 34 and operating conditions in cathode vessel 36 to be optimized, for example, to increase dissolved oxygen concentration. Further optimization may include, for example, allowing electrolytic solution 34 to be maintained at a lower temperature relative to anode electrolytic solution 30, pressurization (e.g., with air or $O_2$) and choice of electrolyte to enhance oxygen solubility (e.g., an electrolytic solution 34 containing a different amount of dissolved $CO_2$ compared to electrolytic solution 30, a different pH, and/or added species that enhance oxygen solubility, such as salts of trifluoroacetic acid).

In yet another embodiment of the disclosed method, continuous flow processes may be advantageously employed to produce copper-containing solutions, eliminating the need for batch processing and reducing overall process time. In such a continuous flow method, a reaction vessel may be sized and dimensioned to maximize contact time between electrolytic solution and first copper and second cathode metals so that a desired copper ion concentration in the electrolytic solution is achieved with a single pass flow of the electrolytic solution through the reaction vessel. Use of impressed current in combination with galvanic coupling may advantageously accelerate dissolution rate of copper so that desired ion concentration is achieved in the single pass flow. Alternatively, such a continuous process reaction vessel and associated flow apparatus may be configured to achieve desired copper ion content in more than one pass of an electrolytic solution through a reaction vessel by, for example, providing a selectable recycle flow path that allows recycling of the electrolytic solution a set number of times (or alternatively, until desired copper ion concentration is measured by sensing apparatus), prior to allowing the copper-laden electrolytic solution to exit the reaction flow path.

Examples of reaction vessel configurations that may be employed in a continuous process embodiment include, but are not limited to, reaction vessels having first copper metal and/or second copper metal structures extending substantially along the majority of the reaction vessel length, and in which the flow path of the reaction vessel is sufficiently long enough to allow a desired copper ion content to be obtained by the time the electrolytic solution reaches the end of the reaction vessel. Flow path and/or internal structure of a continuous flow reaction vessel may be configured to increase copper dissolution using turbulence inducing structures (e.g. shape of the copper and/or cathode metal structures, shape of internal surface of reactor, shape of separate turbulence-inducing structures, etc.). Oxygen-containing and/or $CO_2$-containing gasses may be introduced at single or multiple or continuous points along the length of a continuous process reaction vessel. As with batch process methods, separate vessels and/or electrolytic solutions, as described elsewhere herein, may be employed in combination with a continuous flow process reaction vessel.

Although particular exemplary embodiments have been described and/or illustrated herein, it will be understood that combinations and variations on the methods and apparatus included herein may be employed. For example, multiple copper electrodes and/or cathode metal electrodes may be employed. Furthermore, more than two vessels may be employed to hold multiple cathodes and/or anodes in multiple container embodiments. Further, combinations of power sources, multiple electrodes and/or multiple container embodiments may be combined in many different ways to realize the benefits of the disclosed method.

EXAMPLES

The following examples are illustrative and should not be construed as limiting the scope of the invention or claims thereof.

In the following examples, potentiodynamic curves were generated for copper, silver and stainless steels. Potentiodynamic polarization is an electrochemical technique that can be used for predicting galvanic effects for coupled metals.

APPARATUS AND METHODS FOR THE EXAMPLES

Electrochemical Tests

The effects of galvanic coupling on acceleration of copper dissolution were evaluated by use of potentiodynamic polarization scans. The equipment associated with this technique measures the current that flows through electrodes as a function of applied potential. The magnitude of the current is related to the kinetics of electron transfer processes, such as corrosion of metals. In the case of copper, the measured positive (anodic) current is related to the dissolution rate. For the other metals tested, the potentiodynamic scans show the rate of reduction reaction (cathodic current). For dissolution of copper to take place through oxidation, there must be an equal number of electrons that result in reduction of other species present in solution, such as oxygen. Galvanic coupling of metals to copper can accelerate the dissolution process by providing faster reduction of oxygen than would otherwise occur on the copper surface.

Potentiodynamic scans provide a measurement of the reduction rates that take place on other metals in the test solutions. The current due to galvanic coupling can be identified by overlapping the potentiodynamic scan obtained with copper over the scan obtained with another metal. At the overlap point, the anodic current for copper dissolution will be equal to the cathodic current for the second metal. The galvanic currents can then be compared to the corrosion currents obtained for copper without galvanic coupling. The overlap currents and relative increases over uncoupled copper are provided in the examples, below. This method is further described in: Denny A. Jones, *Principles and Prevention of Corrosion* Macmillan Publishing, New York, 1992, p. 176.

The potentiodynamic polarization scans were performed using an EG&G model 273 potentiostat interfaced to a 386 computer operating EG&G model 352 corrosion software. This equipment was programmed to initiate potentiodynamic polarization scans after four hours of equilibration time once the electrodes were placed into solution. During this four hour equilibration period, polarization resistance scans were performed to measure the corrosion rates.

All of the potentiodynamic polarization scans were performed using a scan rate of 0.2 mV/sec. The scans on copper were initiated at −1200 mV vs. SCE, reversed at +1000 mV vs. SCE, and terminated at 0 mV vs. open circuit potential. Additionally, copper was tested using a modified technique that initiated at 0 mV vs. open circuit and scanned to +500 mV without any cathodic current. There were no differences in results between the two techniques.

The potentiodynamic polarization tests on silver and the stainless steel alloys were performed by starting at 0 mV vs. open circuit and scanning to −1200 mV vs. SCE.

Copper and stainless steel electrodes were prepared by polishing with 600 grit paper, rinsing with deionized water, and placement into an electrode holder exposing 1 $cm^2$ surface area to the solution. The silver rod electrode was similarly polished and placed into solution to expose 2.1 $cm^2$ surface area to the solution.

An EG&G model K0047 test cell was used for all electrochemical tests. Temperature control of the 1 liter glass cell was provided by an electric heating mantel. Test solutions were 600 grams each. High purity nitrogen, air, or oxygen gases were sparged through the liquid via a glass frit. A water cooled condenser was used to contain liquids, but there was no pressurization. A saturated calomel electrode was used as the reference and a graphite rod was used as the counter electrode.

Coupon Tests

With the exception of silver, all metal coupons were 1 inch by 2 inch size and were obtained from Metal Samples Corporation. Exposed surface areas were 25.6 cm² for the copper and the stainless steel coupons. The silver coupons were Engelhard one troy ounce bars of 99.9+% purity and had an exposed surface area of 34.9 cm². Uncoupled coupons were separated from each other by polytetluoroethylene spacers. Galvanic coupling of coupons was performed by use of copper spacers.

Cleaning of the copper coupons was performed according to the method prescribed in ASTM D1384, i.e. pre-test cleaning by brushing with pumice and post-test chemical cleaning in dilute hydrochloric acid followed by additional brushing. The silver and stainless steel coupons were cleaned by the ASTM D1384 method prescribed for carbon steel, which is similar to that of copper but without any acid cleaning. Weight losses generated from dissolution were obtained using an analytical balance with sensitivity to 0.1 mg. Weight changes due to cleaning factors were subtracted from the gross weight changes.

The test solutions were placed into 1 liter glass cylinders and heated to the desired test temperature via electric heating mantles. The temperatures were stabilized prior to placement of the coupons into the test solutions.

Aliquots, of 0.5 mL volume, were removed over time from the test solutions. These samples were analyzed for dissolved copper by atomic absorption spectroscopy.

Example 1

Figure 4:
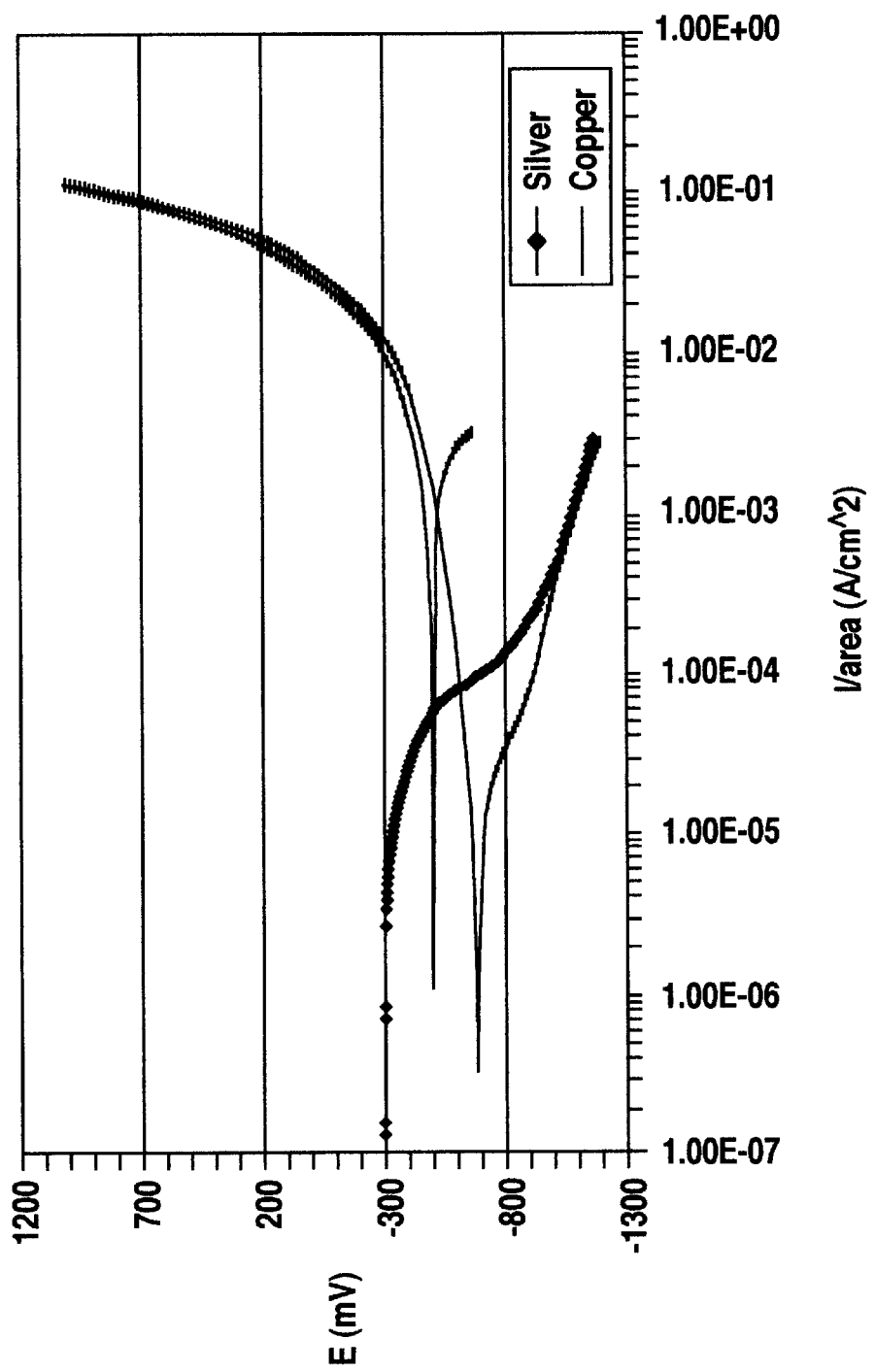
FIG. 4 shows potentiodynamic polarization curves of Example 1.

FIG. 4 shows overlapped potentiodynamic polarization curves for copper and silver in a solution of 40% ethanolamine, loaded with carbon dioxide to a pH of 9.9, at 90C. Continuous air sparge was maintained during the test. The test metals were of equal surface areas and the fluids were unpressurized.

The results of this example show that a galvanic current of 79 $\mu Acm^{-2}$ is predicted to occur due to the coupling of silver with copper. This galvanic current represents a 6.9 fold increase in the dissolution rate.

The greater catalytic activity for oxygen reduction on the silver, compared to copper, eliminates the restriction for overall current flow that occurs on copper alone. The electrons flowing from copper during oxidation (dissolution) can now flow to the silver electrode and be transferred to dissolved oxygen molecules.

Example 2

Figure 5:
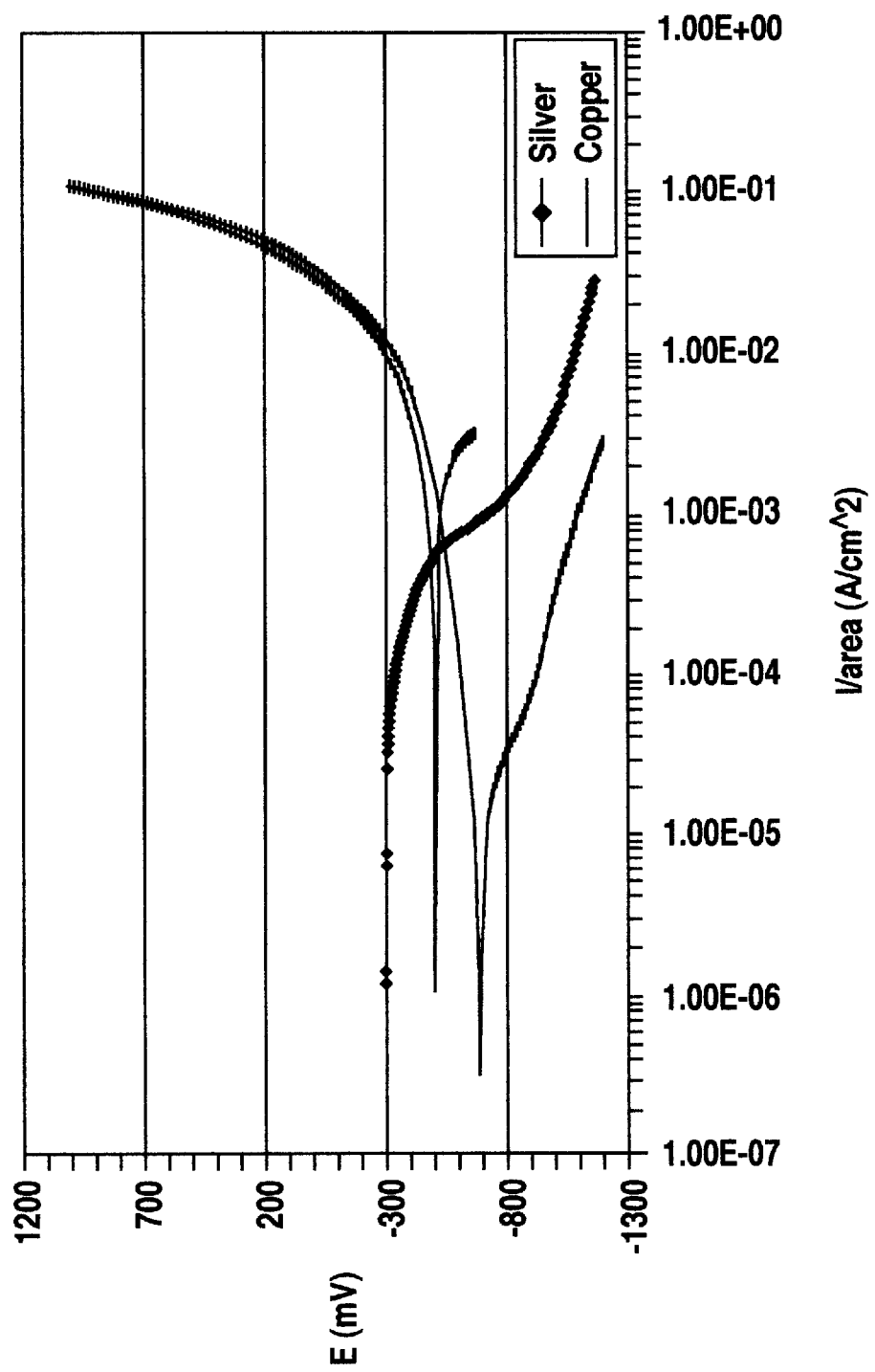
FIG. 5 shows potentiodynamic polarization curves of Example 2.

FIG. 5 shows overlapped potentiodynamic polarization curves for copper and silver for conditions similar to Example 1. Compared to Example 1, however, Example 2 shows the predicted galvanic current density when the surface area of silver exceeds the surface area for copper by a ratio of 10 to 1.

The results of this example show that a galvanic current of 640 $\mu Acm^{-2}$ is predicted to occur due to the coupling of silver with copper. This galvanic current represents a 56-fold increase in anodic current of copper.

The increase in relative surface area of silver produces enhanced rates in copper dissolution.

Example 3

Figure 6:
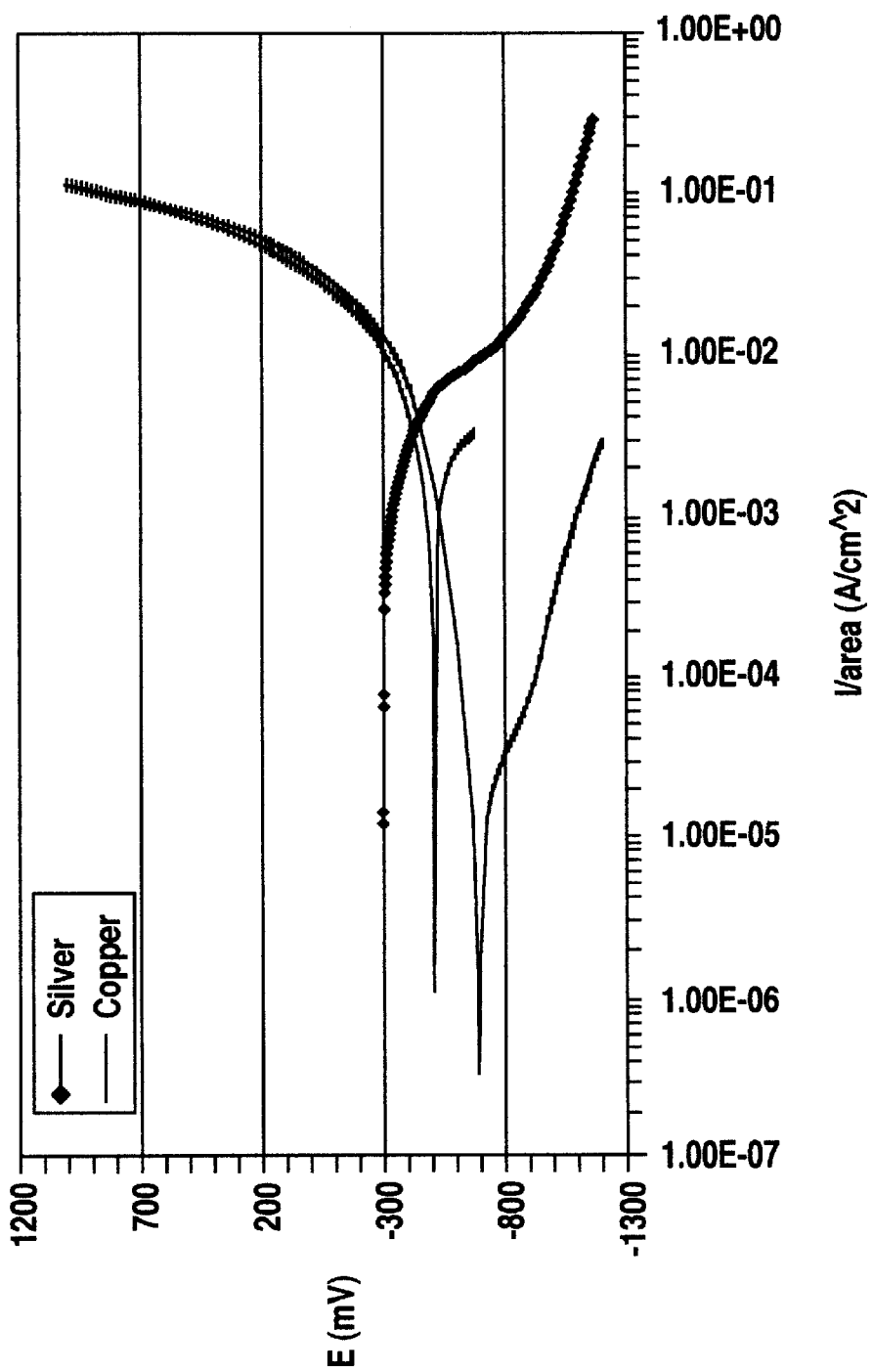
FIG. 6 shows potentiodynamic polarization curves of Example 3.

FIG. 6 shows overlapped potentiodynamic polarization curves for copper and silver for conditions similar to Example 1. Compared to Example 1, however, Example 3 shows the predicted galvanic current density when the surface area of silver exceeds the surface area for copper by a ratio of 100 to 1.

The results of this example show that a galvanic current of 3600 $\mu Acm^{-2}$ is predicted to occur due to the coupling of silver with copper. This galvanic current represents a 310-fold increase in anodic current of copper.

The further increase in relative surface area of silver produces even greater rates of copper dissolution.

Example 4

Figure 7:
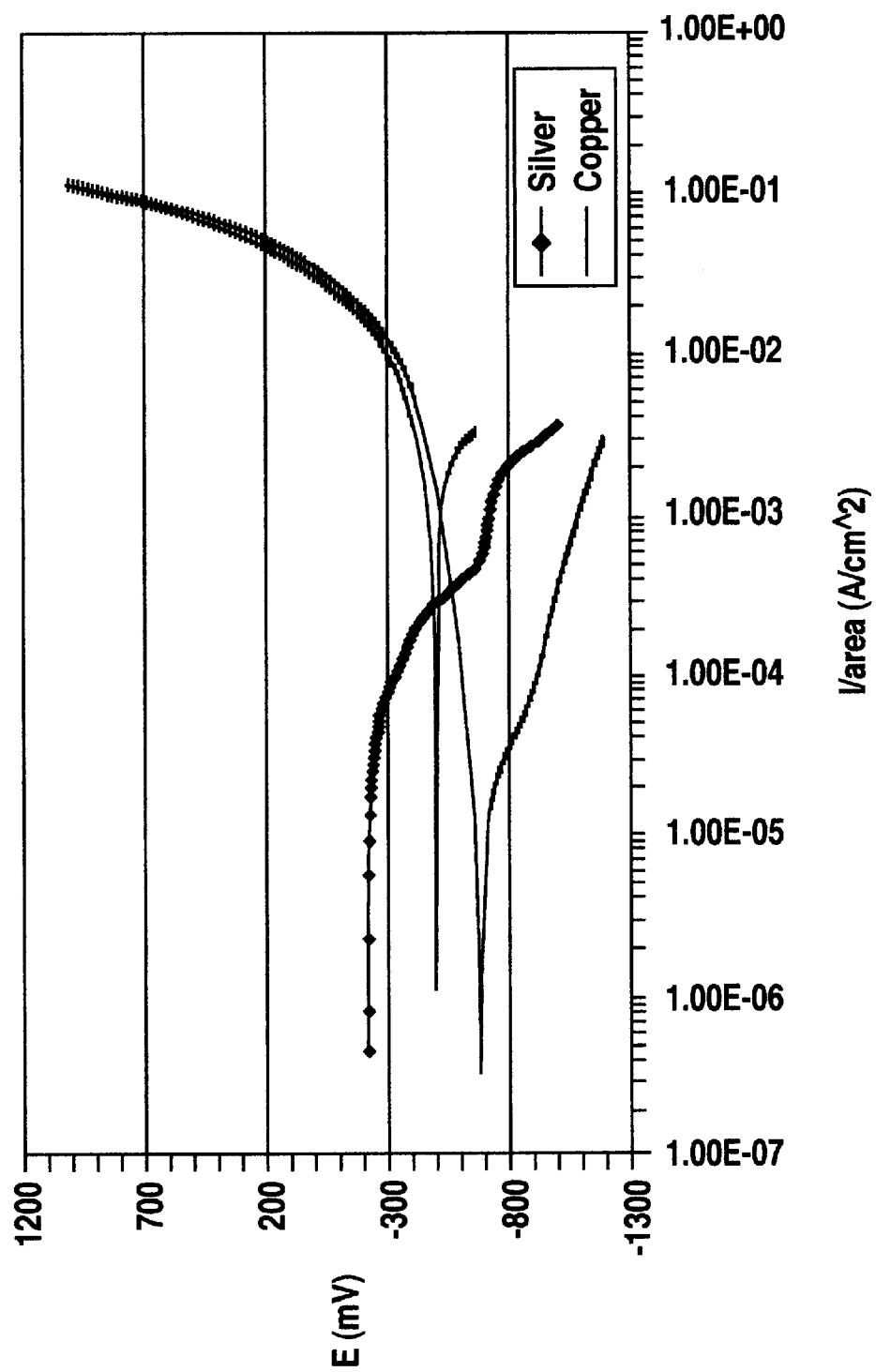
FIG. 7 shows potentiodynamic polarization curves of Example 4.

FIG. 7 shows overlapped potentiodynamic polarization curves for copper and silver for conditions similar to Example 1 except that the curve for silver was obtained with oxygen gas instead of air.

The results of this example show that a galvanic current of 352 $\mu Acm^{-2}$ is predicted to occur due to the coupling of silver with copper. This galvanic current represents a 31-fold increase in anodic current of copper.

The use of oxygen gas results in a higher concentration of dissolved oxygen. The reduction of oxygen at the silver surface is enhanced by the increase in dissolved oxygen concentration. This increased current flow at the silver surface produces increased oxidation current for copper, i.e., faster copper dissolution.

Example 5

Figure 8:
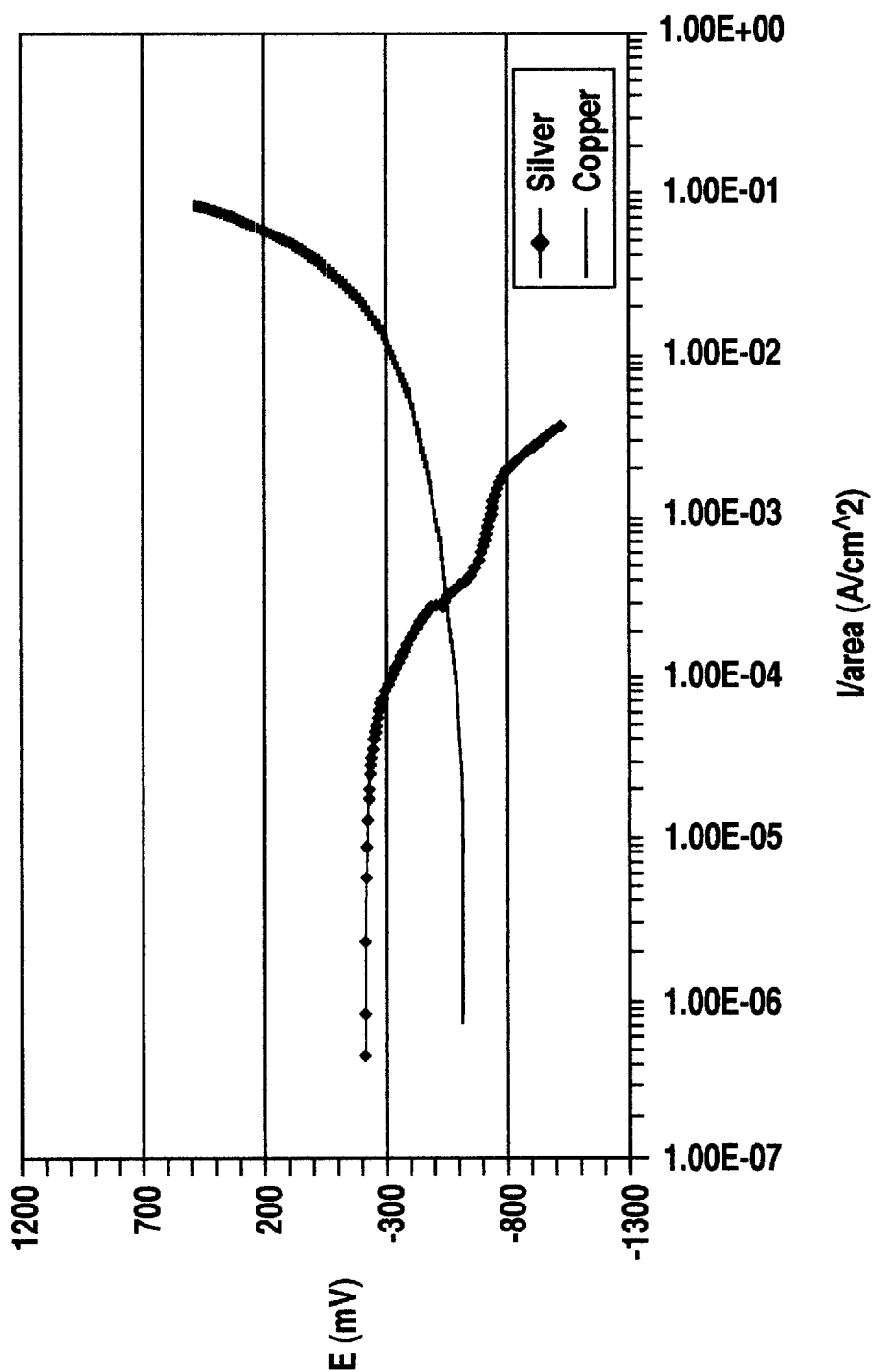
FIG. 8 shows potentiodynamic polarization curves of Example 5.

FIG. 8 shows overlapped potentiodynamic polarization curves for copper and silver for conditions similar to Example 4 except that now both metals were exposed to oxygen gas instead of air.

The results of this example show that a galvanic current of 306 $\mu Acm^{-2}$ is predicted to occur due to the coupling of silver with copper. This galvanic current represents a 27-fold increase in anodic current of copper.

Of note is that the galvanic current obtained when both metals are exposed to oxygen is less than obtained in Example 4. This is due to a shift in the open circuit potential of copper to more positive potential. This shift results in lower copper oxidation current at the overlap point than occurs when copper is in air. Placement of the silver electrode into a separate compartment has the advantage of being able to use oxygen gas in the catholyte compartment and air in the copper compartment, thereby increasing dissolution rates.

Example 6

Figure 9:
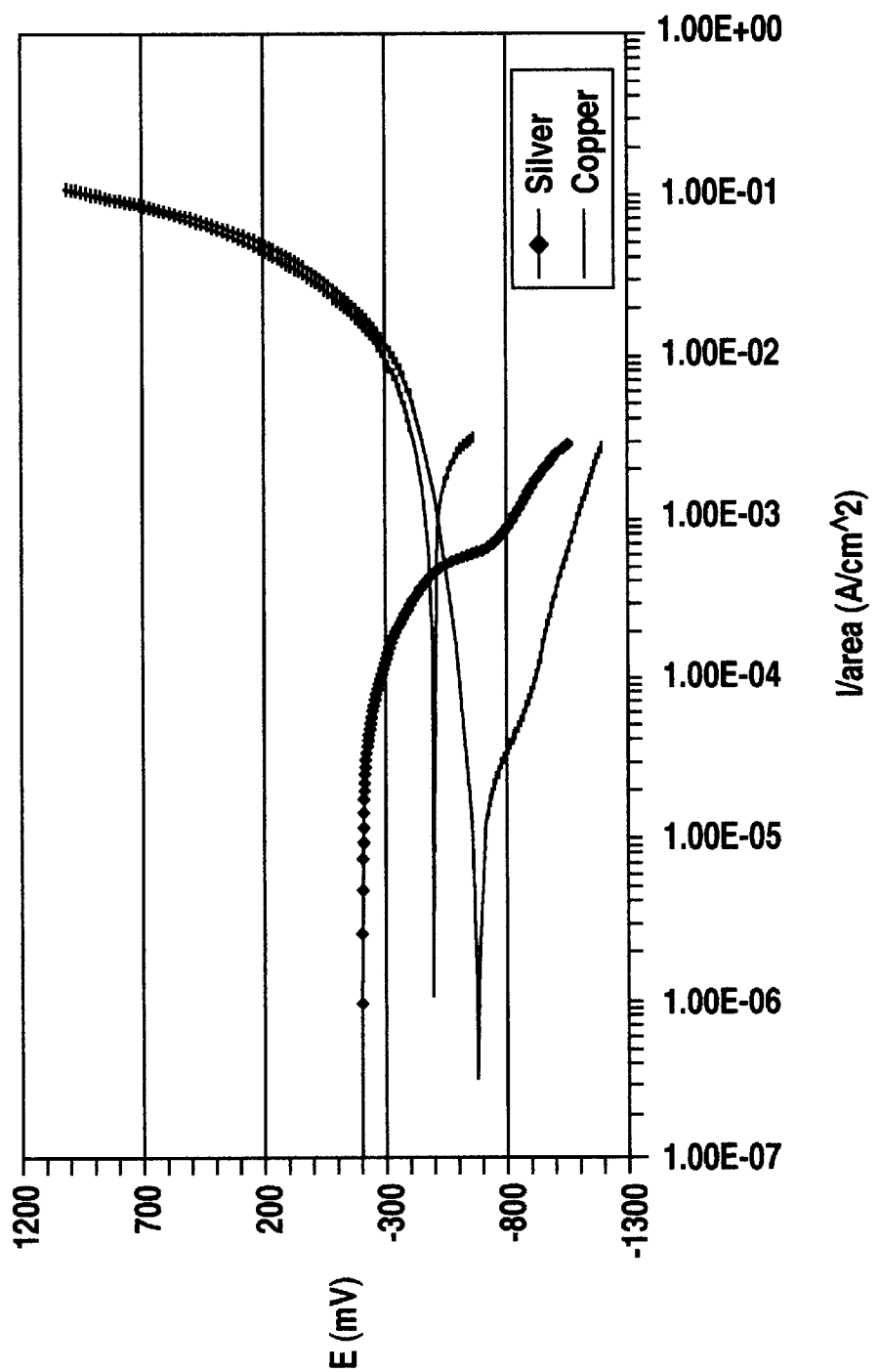
FIG. 9 shows potentiodynamic polarization curves of Example 6.

FIG. 9 shows overlapped potentiodynamic polarization curves for copper and silver for conditions similar to Example 4 except that carbon dioxide is now deleted from the test fluid for silver only.

The results of this example show that a galvanic current of 536 $\mu Acm^{-2}$ is predicted to occur due to the coupling of silver with copper. This galvanic current represents a 47-fold increase in anodic current of copper.

The presence of carbon dioxide decreases the oxygen solubility in the ethanolamine solutions at 90C. Deletion of carbon dioxide from the solution in contact with silver increases the dissolved oxygen concentration and results in higher cathodic current density at silver and higher overall predicted galvanic current. Placement of the silver electrode into a separate compartment has the advantage of being able to delete the carbon dioxide from the catholyte solution and thereby increase the copper dissolution rate.

Example 7

Figure 10:
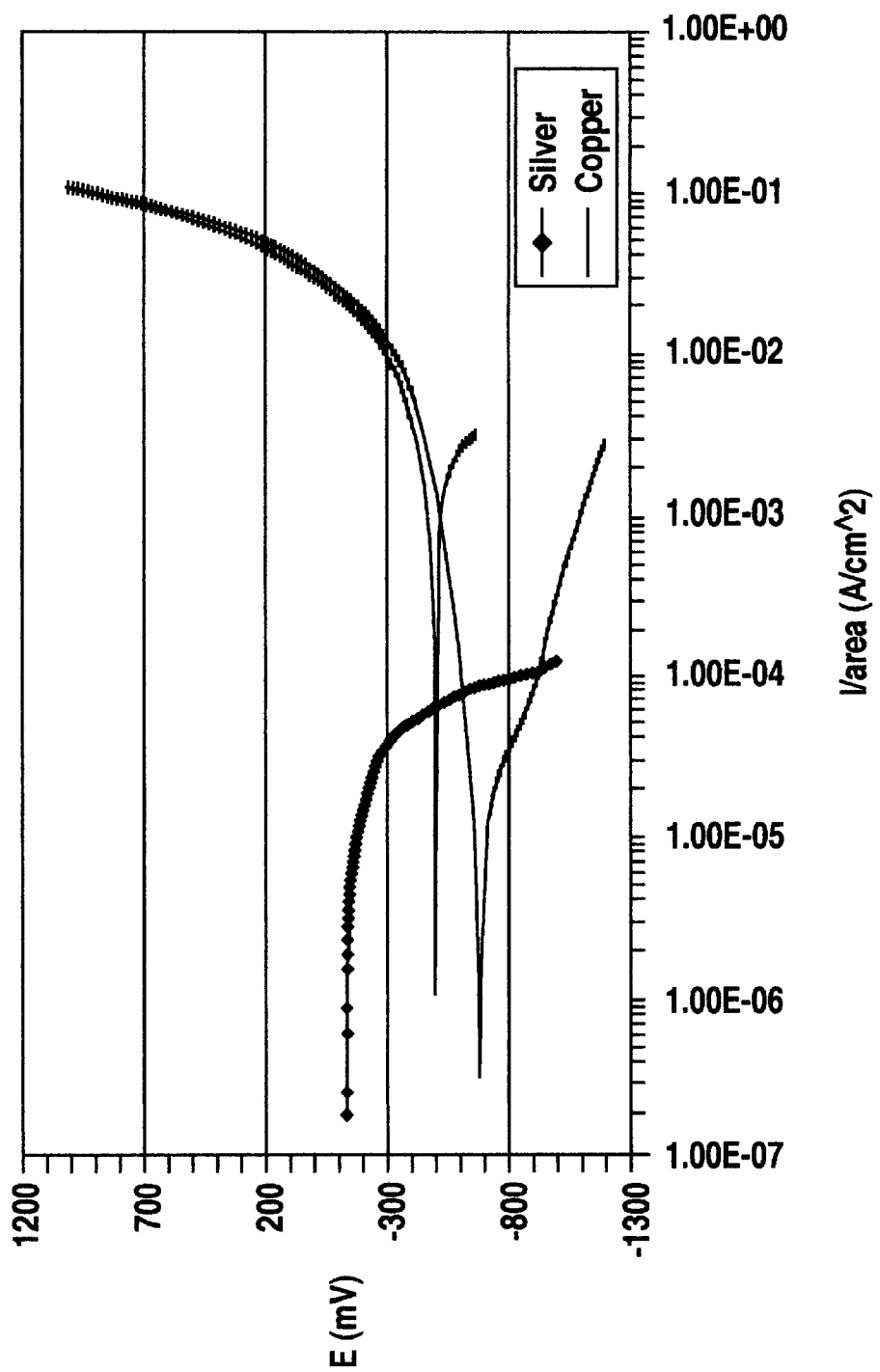
FIG. 10 shows potentiodynamic polarization curves of Example 7.

FIG. 10 shows overlapped potentiodynamic polarization curves for copper and silver for conditions similar to Example 1. Compared to Example 1, however, the silver test solution is now at a temperature of 21° C. while the copper test solution is still at 90° C.

The results of this example show that a galvanic current of 79 $\mu Acm^{-2}$ is predicted to occur due to the coupling of silver with copper. This galvanic current represents a 6.9 fold increase in anodic current of copper.

The dissolved oxygen concentration is increased at the lower temperature, which should increase the reduction current density at silver. However, the kinetics of the reduction process are also slowed at the lower temperature. The slower kinetics offsets the higher dissolved oxygen concentration resulting in essentially no net change.

Example 8

Figure 11:
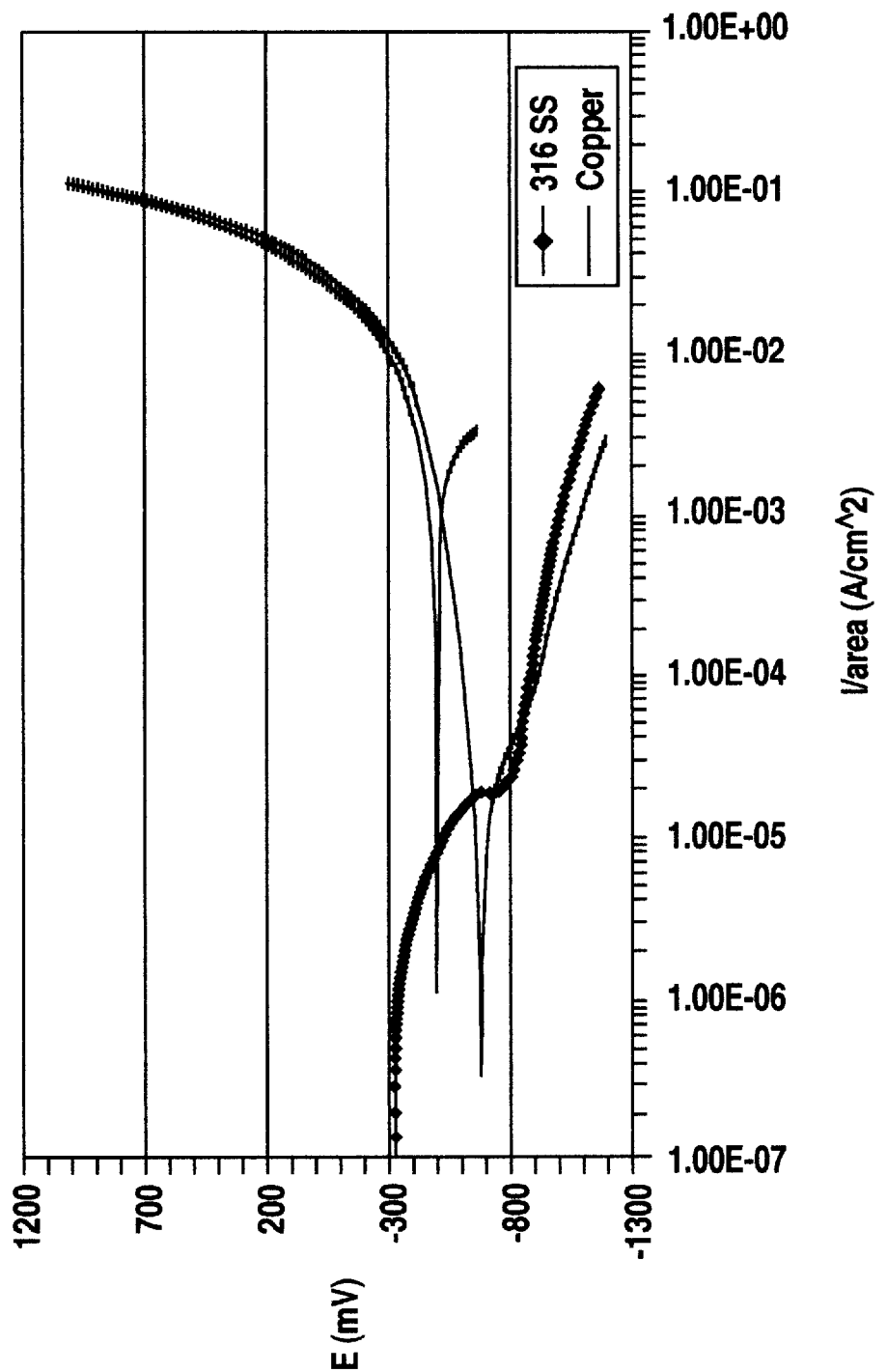
FIG. 11 shows potentiodynamic polarization curves of Example 8.

In the following example, the galvanic effect of 316 stainless steel is shown by overlap of the potentiodynamic curve with that of copper, as shown in FIG. 11. Other than replacement of silver by 316 stainless steel, the test conditions are the same as in Example 1.

The results of this example show that a galvanic current of 15.7 $\mu Acm^{-2}$ is predicted to occur due to the coupling of silver with 316 stainless steel. This galvanic current represents a 1.4 fold increase in anodic current of copper.

Although not as effective as silver under the same conditions, 316 stainless steel does impart galvanic acceleration of copper dissolution.

Example 9

Figure 12:
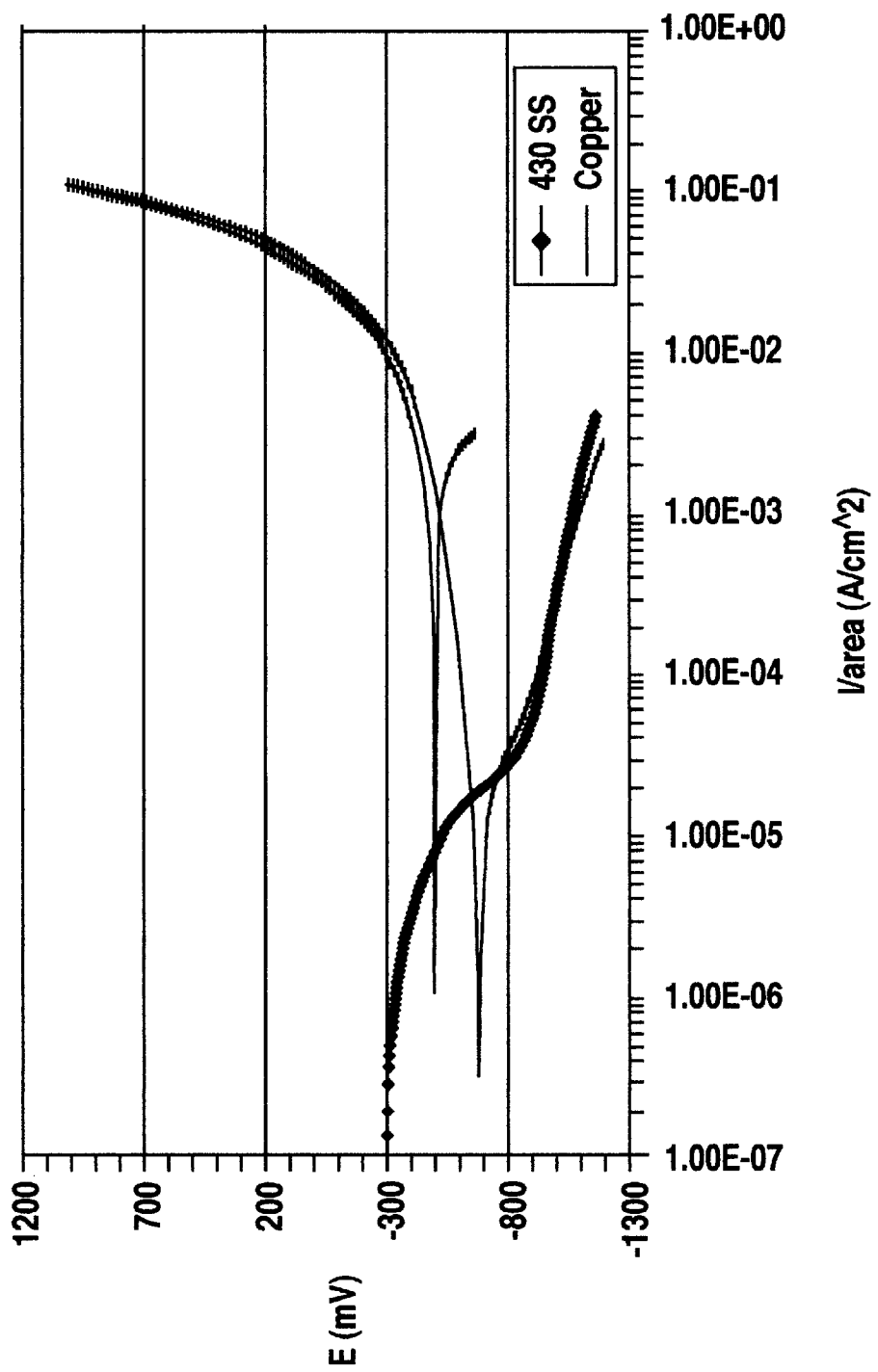
FIG. 12 shows potentiodynamic polarization curves of Example 9.

In the following example, the galvanic effect of 430 stainless steel is shown by overlap of the potentiodynamic curve with that of copper, as is shown in FIG. 12. Other than replacement of silver by 316 stainless steel, the test conditions are the same as in Example 1.

The results of this example show that a galvanic current of 17 $\mu Acm^{-2}$ is predicted to occur due to the coupling of silver with 430 stainless steel. This galvanic current represents a 1.5 fold increase in anodic current of copper.

The galvanic acceleration of copper dissolution obtained with 430 stainless steel is similar to that obtained with 316 stainless steel (Example 8).

Example 10

Figure 13:
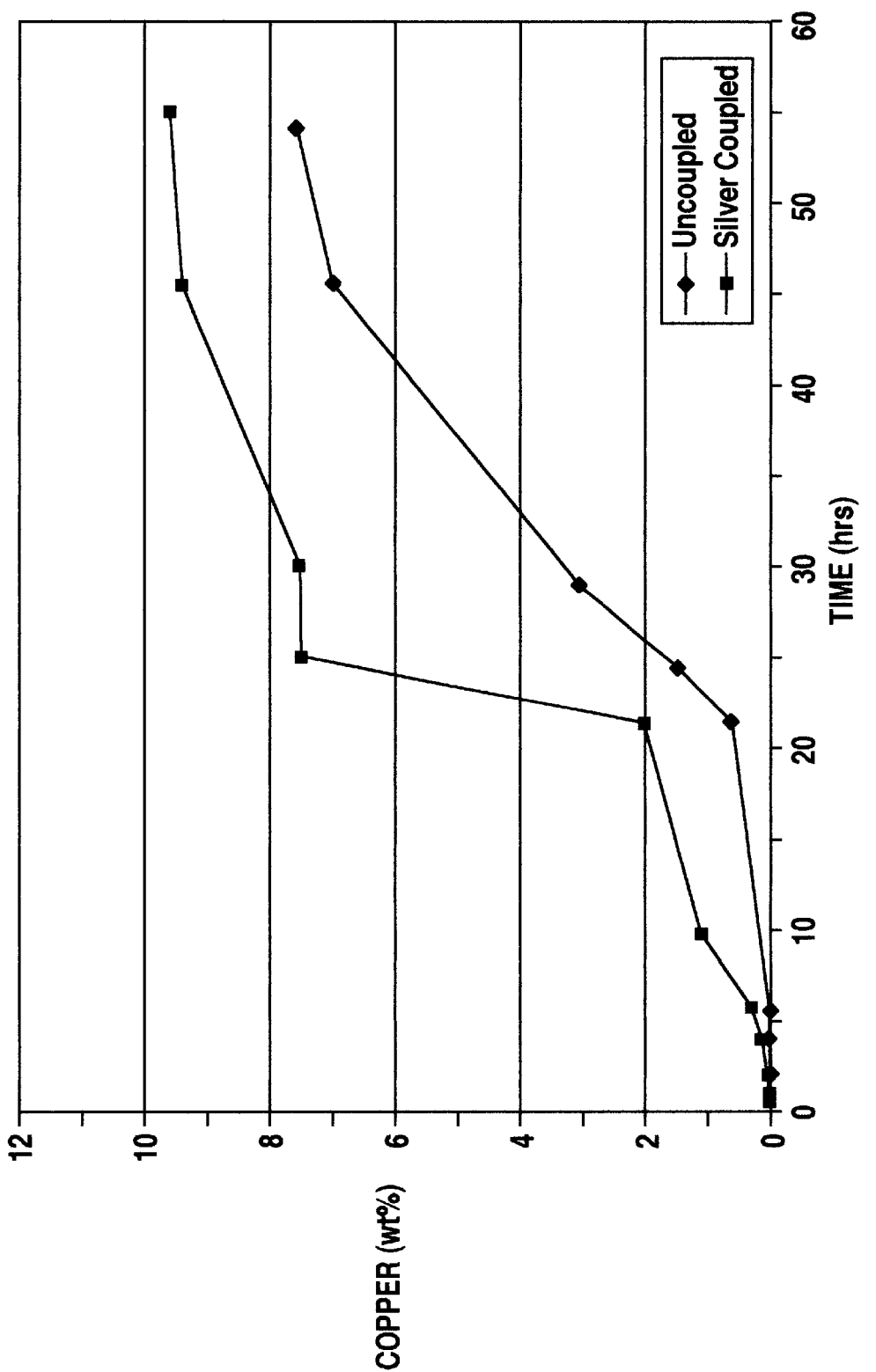
FIG. 13 shows dissolved copper concentrations versus time for Example 10.

In FIG. 13, dissolved copper concentrations are shown vs. time for a single copper coupon exposed to 160 grams of 40% ethanolamine, loaded with carbon dioxide to a pH of 9.9, and maintained at 90° C. while sparging with air. The dissolved copper concentrations obtained with a silver coupon coupled to the copper coupon are overlayed.

The dissolved copper concentration builds up more rapidly when the copper is coupled to silver compared to the uncoupled copper. At 32 hours, the galvanic effect of silver coupling has produced double the copper concentration of uncoupled copper. At test termination, greater than 9.5% dissolved copper has been achieved with silver coupling vs. 7.5% without galvanic coupling.

Example 11

Figure 14:
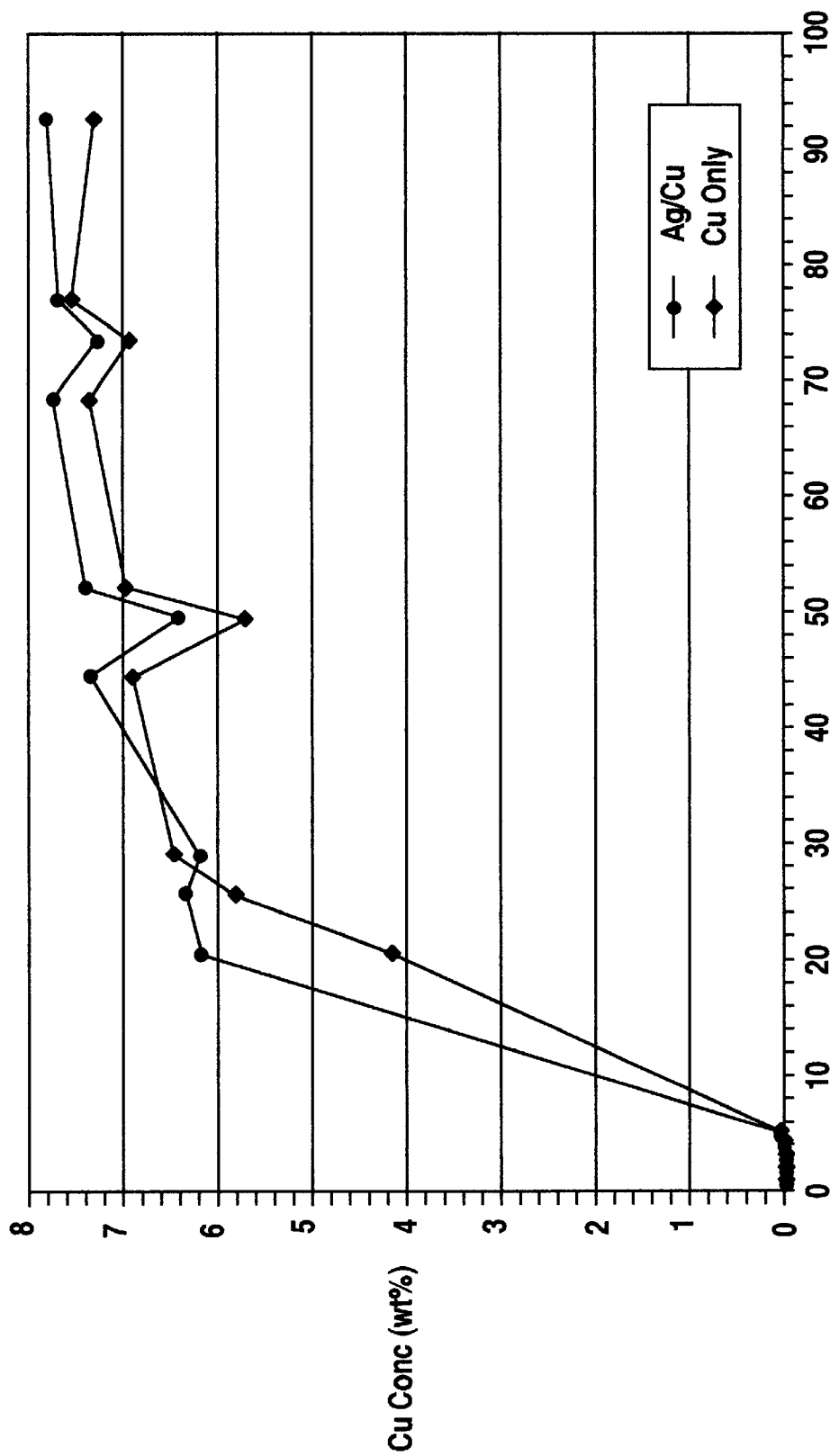
FIG. 14 shows dissolved copper concentrations versus time for Example 11.

In FIG. 14, dissolved copper concentrations are shown vs. time for uncoupled copper coupons and silver-coupled copper coupons. A total of 32 copper coupons are present in both the uncoupled and the silver coupled tests for a duration of 92.5 hours. Test fluid mass is 800 grams. A temperature of 90° C. and continuous air sparge were maintained during the test.

In comparison to example 10, the amount of copper present relative to solution was increased. Furthermore, the test incorporating coupling with silver is now a reduced 1:4 ratio of silver to copper (versus 1:1 in Example 10).

As in Example 10, a faster rate of copper dissolution is observed by the galvanic effect of silver. At 21 hours, the silver-coupled test solution has a dissolved copper concentration of 6.2% vs. 4.1% for the uncoupled test solution.

Also, a higher equilibrium concentration of dissolved copper is observed when silver coupling is present. The increased thermodynamic force for copper dissolution applied by galvanic coupling increases the equilibrium concentration to about 7.7% vs. 7.3% obtained without galvanic coupling.

Example 12

In Table 2, the weight losses of copper coupons are shown when uncoupled and when coupled to either 316 stainless steel or to 430 stainless steel (at 1:1 surface area ratios). The coupons were exposed to the same test fluid and test conditions as in Example 11 but with varying temperature, as shown in the Table. The test duration was 138 hours for the 50 and 70° C. tests and 185 hours for the 90° C. test.

TABLE 2

| Temperature (° C.) | Copper Coupon Weight Losses (grams) | | |
|---|---|---|---|
| | Uncoupled | 316 SS Coupled | 430 SS Coupled |
| 50 | 10.5 | 12.2 | 13.8 |
| 70 | 12 | 14.4 | 14 |
| 90 | 12.7 | 15.4 | 16.6 |

Higher copper weight losses are observed when copper is coupled to either stainless steel alloy at all three test temperatures. The galvanic coupling again produces a greater rate of copper dissolution, this time using stainless steel alloys.

Example 13

In the following example, an impressed voltage of +500 mV vs. SCE was applied to a copper electrode. This voltage produced a current of 58 $mAcm^{-2}$. This current is equivalent to a corrosion rate of greater than 26,000 mils per year ("mpy"). Sustaining this current would result in a dissolved copper concentration of 9 wt % within 8 hours.

This example shows that impressed voltages or currents may be utilized to rapidly dissolve copper into solution. An appropriate cathode electrode, such as silver, may be used to sustain this current.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations. For example, non-metallic materials which have a more positive reduction potential relative to copper under selected electrolytic conditions may be substituted in any of the embodiments described herein in which second cathode metals are employed. Examples of such non-metallic cathodic materials include, but are not limited to, carbon, graphite, and electrically conducting polymers (such as polypyrrole, polyaniline, polyparaphenylene, polythiophene, polyacetylene, etc.) It will be understood with benefit of this disclosure by those of skill in the art that effective amounts of one or more of the individual electrolytic solution components described herein may be selected or chosen to fit characteristics of particular electrolytic solutions and copper dissolution results (e.g., dissolution rates, etc.) desired therefrom.

REFERENCES

The following references, to the extent that they provide exemplary details supplementary to those set forth herein, are specifically incorporated herein by reference:

U.S. Pat. No. 4,008,342
U.S. Pat. No. 4,038,086
U.S. Pat. No. 4,225,637
U.S. Pat. No. 4,259,378
U.S. Pat. No. 4,761,179
U.S. Pat. No. 4,857,322
U.S. Pat. No. 4,929,454
U.S. Pat. No. 5,276,029
U.S. Pat. No. 5,395,656
U.S. Pat. No. 5,426,121
U.S. Pat. No. 5,731,036
U.S. Pat. No. 5,824,370
U.S. Pat. No. 5,853,766
European Application No. 023841
An Electrochemical Study on the Dissolution of Copper and Silver from Silver-Copper Alloys by Y. Charles Guan and Kenneth N. Han, Jounal of the Electrochemical Society v. 142, no. 6, pp. 1819–1824 (June 1995)
Effect of Ethanolamines, Ethylenediamine and Ethyleneglycol on the Corrosion of Copper in Nitric Acid by A. S. Fouda and A. K. Mohamed, J. Electrochem. Soc. India, pp. 244–246 (1990)
Corrosion of A-53 Steel and Copper in an Aqueous Solution of Monoethanolamine, by Slavoljub Kostic and Streten Mladenovic, Journal Zast. Mater., 80:66042 CA, 21(7–8), pp. 167–70 (1973)
Local Corrosion of Condenser Tubes in Desulfurization Apparatus for Petroleum Industry by Naito et al., Journal Sekiyu Gakkii Shi, 70:60274 CA, 11(11), pp. 872–5 (1968)
French Patent No. 2167327 (1973) entitled Chemical Dissolution of Copper

What is claimed is:

1. A method for dissolving copper, comprising:
   electrically coupling a first copper metal to a second cathode material;
   exposing said first copper metal to a first electrolytic solution comprising water, nitrogen compound and carbon dioxide; and
   exposing said second cathode material to a second electrolytic solution comprising water and oxygen;
   wherein said first and second solutions are in ionic communication with each other;
   wherein said second cathode material has a more positive reduction potential than said first copper metal given the respective electrolyte conditions present at said first copper metal and at said second cathode material; and
   wherein copper ions are released by said first copper metal into said first electrolytic solution.

2. The method of claim 1, wherein said second cathode material comprises at least one of silver, iron, nickel, molybdenum, zinc, zirconium, gold, platinum, palladium, aluminum, stainless steel, chromium, carbon, graphite, polypyrrole, polyaniline, polyparaphenylene, polythiophene, polyacetylene, or a mixture thereof.

3. The method of claim 1, wherein said second cathode material comprises silver.

4. The method of claim 1, further comprising introducing a gas comprising oxygen into said second electrolytic solution.

5. The method of claim 1, wherein said first and second solutions are the same solution.

6. The method of claim 1, wherein said first solution is contained within a first vessel, and wherein said second solution is contained within a second vessel, said first and second vessels being in ionic communication with each other.

7. The method of claim 6, wherein said first and second vessels are in ionic communication through an ion-permeable membrane.

8. The method of claim 1, wherein said method is a continuous feed process in which said exposing of said first metal to said first solution occurs within a reaction vessel; and wherein a feedstream comprising said first solution is introduced into said vessel simultaneously with the withdrawal of an effluent stream comprising said first solution from said reaction vessel.

9. The method of claim 1, further comprising applying anodic current to said first metal and cathodic current to said second cathode material.

10. The method of claim 1, wherein said first solution comprises from about 1% to about 80% 2-hydroxyethlylamine by weight of total solution, and from about 50 ppm to about 50% by weight of the weight of total solution of dissolved carbon dioxide.

11. The method of claim 1, wherein said second solution comprises from about 0.001 ppm to about 5000 ppm dissolved oxygen.

12. The method of claim 1, wherein said first electrolytic solution further comprises at least one of a separate chelating agent, separate oxidizing agent, or a mixture thereof; or wherein said second electrolytic solution further comprises a separate oxidizing agent.

13. The method of claim 12, wherein said separate chelating agent comprises at least one of polyamine, crown ether, carboxylic acid salt, carbamate, amide, urea, sulfate, phosphate, phosponate, or mixtures thereof; and wherein said separate oxidizing agent comprises at least one of iron (III) salt, tin (IV) salt, peroxide, bisulfate, permanganate, perchlorate, nitrate, iodate, Cu (II) salt, hypochlorate, bromate, dichromate, or mixtures thereof.

14. A method for dissolving copper, comprising:
   electrically coupling a first metal comprising copper to a second cathode metal, said second cathode metal comprising at least one of iron, nickel, chromium, silver, stainless steel, or a mixture thereof;
   exposing said first metal to a first electrolytic solution comprising from about 1% to about 80% 2-hydroxyethlylamine by weight of total solution;
   exposing said second cathode metal to a second electrolytic solution comprising water;
   introducing a gas comprising carbon dioxide into said first electrolytic solution so that said first electrolytic solution further comprises from about 50 ppm to about 50% by weight of total weight of said first electrolytic solution of dissolved carbon dioxide;

introducing a gas comprising oxygen into said second electrolytic solution so that said second electrolytic solution further comprises from about 0.001 ppm to about 5000 ppm oxygen;

wherein said first and second solutions are in ionic communication with each other; and wherein copper ions are released by said first metal into said first electrolytic solution.

15. The method of claim 14, wherein said second cathode metal comprises silver.

16. The method of claim 14, wherein said first and second solutions are the same solution.

17. The method of claim 14, wherein said first solution is contained within a first vessel, and wherein said second solution is contained within a second vessel, said first and second vessels being in ionic communication with each other.

18. The method of claim 17, wherein said first and second vessels are in ionic communication through an ion-permeable membrane.

19. The method of claim 14, wherein said method is a continuous feed process in which said exposing of said first metal to said first solution occurs within a reaction vessel; and wherein a feedstream comprising said first solution is introduced into said vessel simultaneously with the withdrawal of an effluent stream comprising said first solution from said reaction vessel.

20. The method of claim 19, further comprising applying anodic current to said first metal and cathodic current to said second cathode metal.

21. The method of claim 14, further comprising applying anodic current to said first metal and cathodic current to said second cathode metal.

22. The method of claim 14, wherein prior to said exposing of said first metal to said first solution a content of dissolved copper in said first solution is less than about 0.2% by weight of total weight of said first solution; and wherein said exposing further comprises exposing said first metal to said first solution until a content of dissolved copper in said first solution is from about 0.2% to about 15% by weight of total weight of said first solution.

23. The method of claim 14, wherein said first electrolytic solution further comprises at least one of a separate chelating agent, separate oxidizing agent, or a mixture thereof; or wherein said second electrolytic solution further comprises a separate oxidizing agent;

wherein said separate chelating agent comprises at least one of ethylenediamine tetra-acetic acid ("EDTA"), citrate, oxalate, diethylene triamine, hydroxyethylcarbamate, tris-hydroxyethylethylenediamine, bis-hydroxyethylurea, aminoethylphosphonate, or a mixtures thereof; and wherein said separate oxidizing agent comprises at least one of hydrogen peroxide, ozone, nitrous oxide, nitric oxide, permaganate, perchlorate, iodate, nitrate, benzoquinone, or mixtures thereof.

24. A method for dissolving copper, comprising:

electrically coupling a first copper metal to a cathode electrode;

exposing said first copper metal to a first electrolytic solution comprising water, nitrogen compound and carbon dioxide; exposing said cathode electrode to a second electrolytic solution comprising water and oxygen, and wherein said first and second electrolytic solutions are in ionic communication with each other, and applying anodic current to said first metal and cathodic current to said cathode electrode;

wherein copper ions are released by said first metal into said first electrolytic solution.

25. The method of claim 24, wherein said cathode electrode comprises a material having a more positive reduction potential than said first copper metal given the respective electrolyte conditions present at said first copper metal and at said cathode electrode.

* * * * *